(12) United States Patent
Chernyshov

(10) Patent No.: US 8,421,257 B2
(45) Date of Patent: Apr. 16, 2013

(54) TETHERED GLIDER SYSTEM FOR POWER GENERATION

(76) Inventor: Dimitri Chernyshov, Newmarket, NH (US)

( * ) Notice: Subject to any disclaimer, the term of this patent is extended or adjusted under 35 U.S.C. 154(b) by 379 days.

(21) Appl. No.: 12/721,862

(22) Filed: Mar. 11, 2010

(65) Prior Publication Data

US 2010/0230968 A1  Sep. 16, 2010

Related U.S. Application Data

(60) Provisional application No. 61/159,160, filed on Mar. 11, 2009, provisional application No. 61/247,643, filed on Oct. 1, 2009.

(51) Int. Cl.
*F03D 9/00* (2006.01)
*H02P 9/04* (2006.01)

(52) U.S. Cl.
USPC .......................................... 290/44

(58) Field of Classification Search .......... 290/42–44, 290/52–55
See application file for complete search history.

(56) References Cited

U.S. PATENT DOCUMENTS 3,987,987 A * 10/1976 Payne et al. ............... 244/153 R
2010/0026007 A1 * 2/2010 Bevirt ............................ 290/55

* cited by examiner

*Primary Examiner* — Javaid Nasri

(57) ABSTRACT

A complete fully-automated airborne wind energy generation system with three major components; a ground-based energy trailer anchored to the ground containing a reel, motor/generator, motor controller with regenerative braking, a low-friction capstan, and a microcontroller; an 'aerie' elevated launch and landing platform free to weathervane in the wind, with a tether flag deployment and collection device; a statically and dynamically stable rotor-glider with variable pitch rotor blades enabling jump-launch, on-board weather and load sensors, microcontroller, and cell or satellite phone data connections to a centralized database; and a high-strength low-weight tether connecting all the components together.

17 Claims, 20 Drawing Sheets

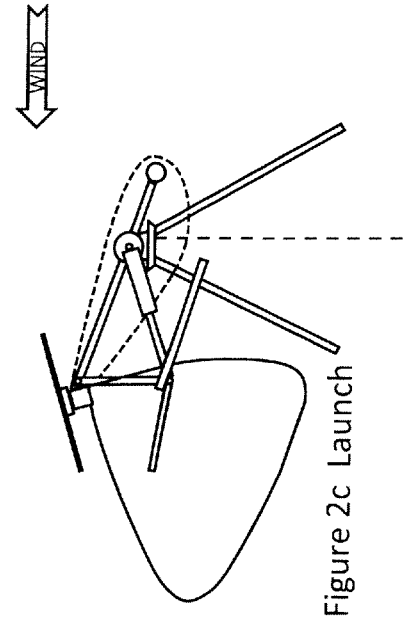
Figure 2c Launch
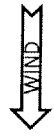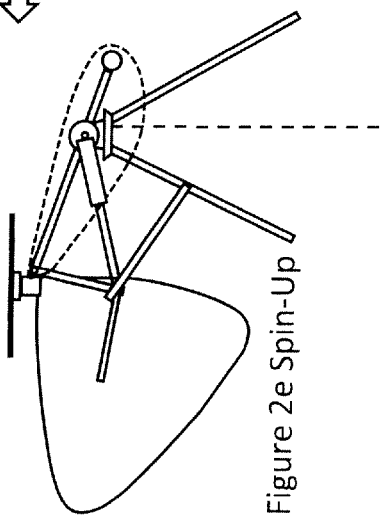
Figure 2e Spin-Up
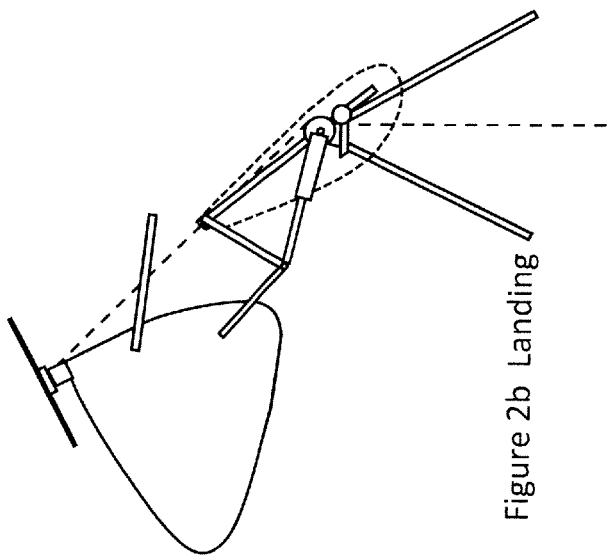
Figure 2b Landing
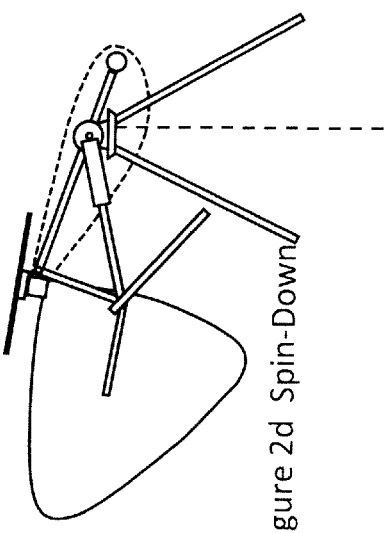
Figure 2d Spin-Down

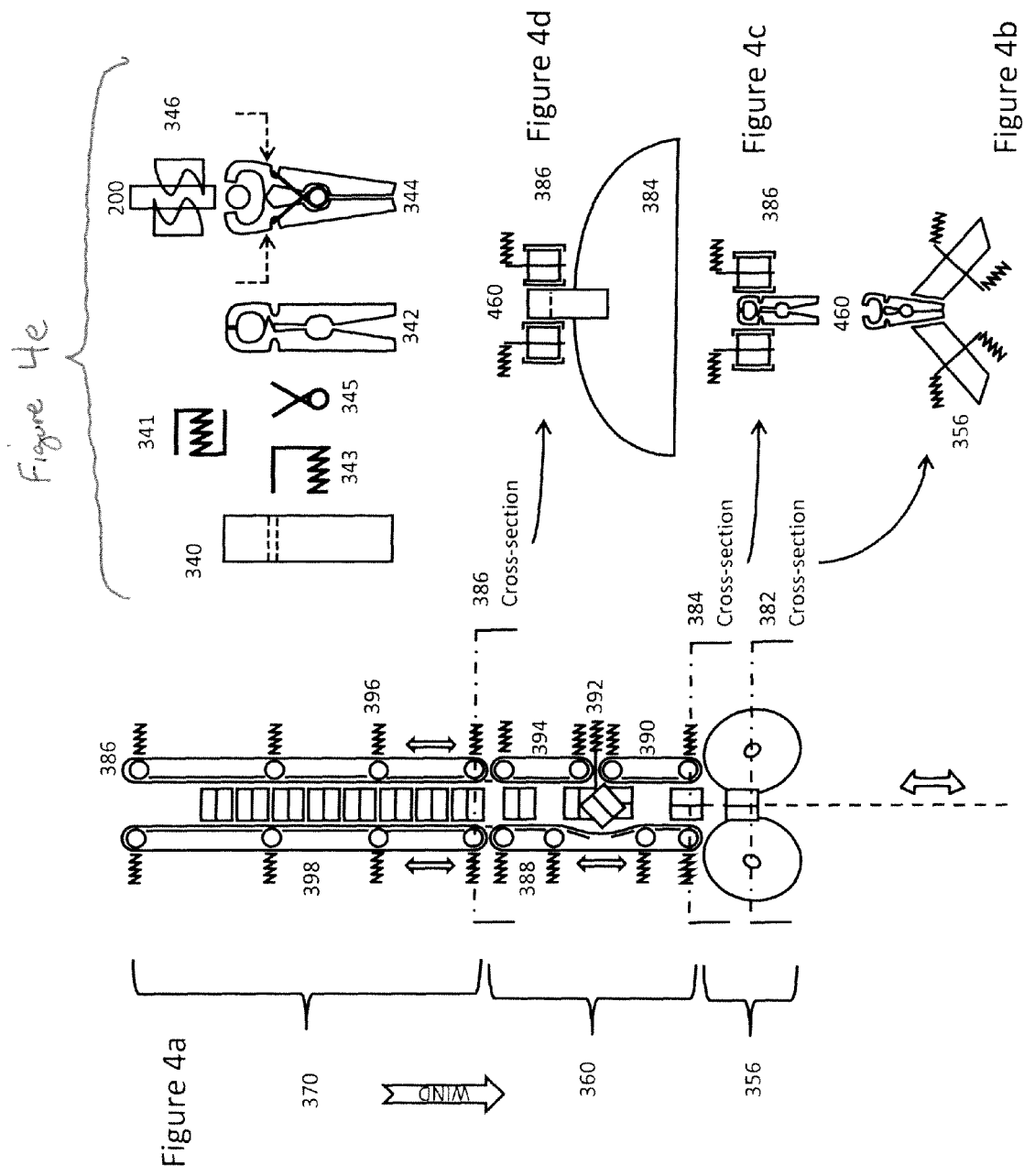

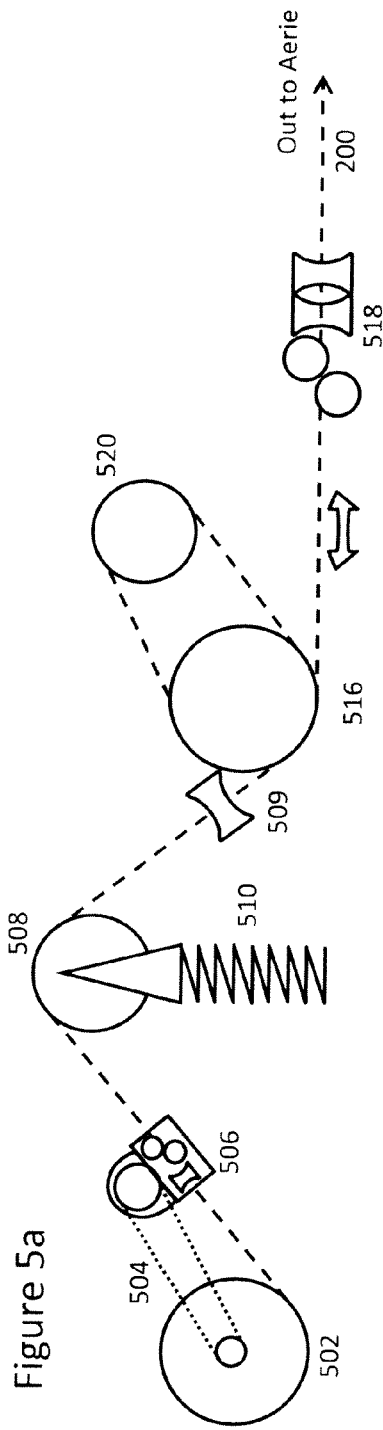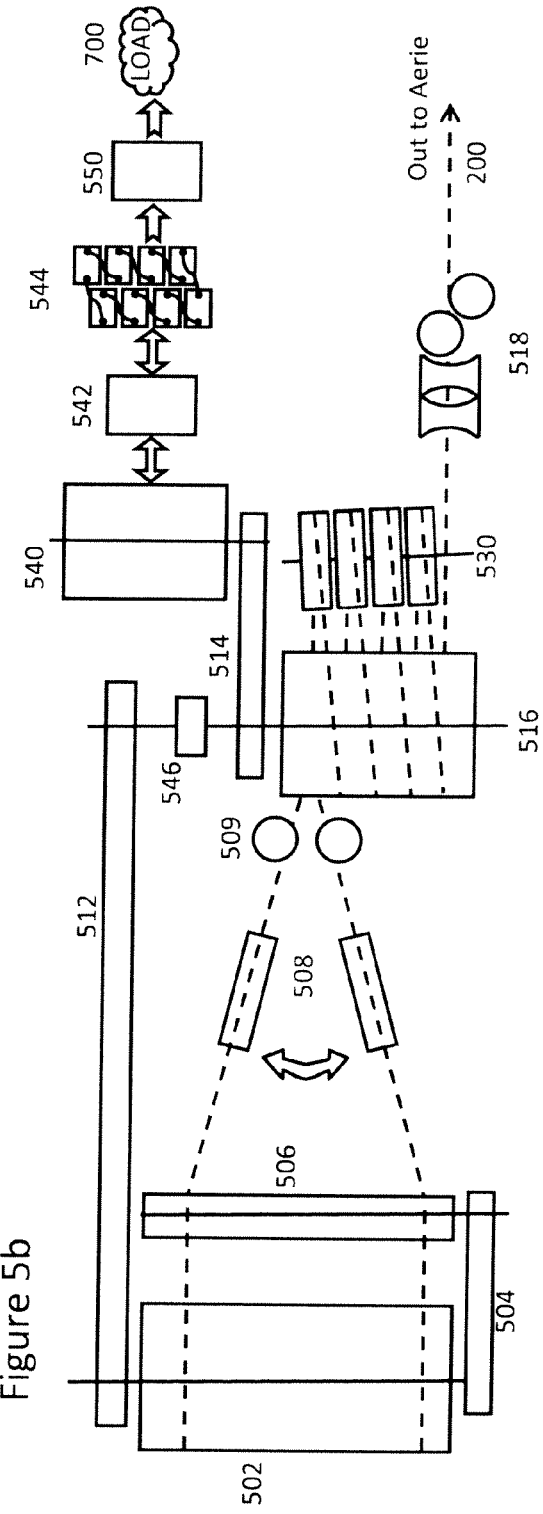

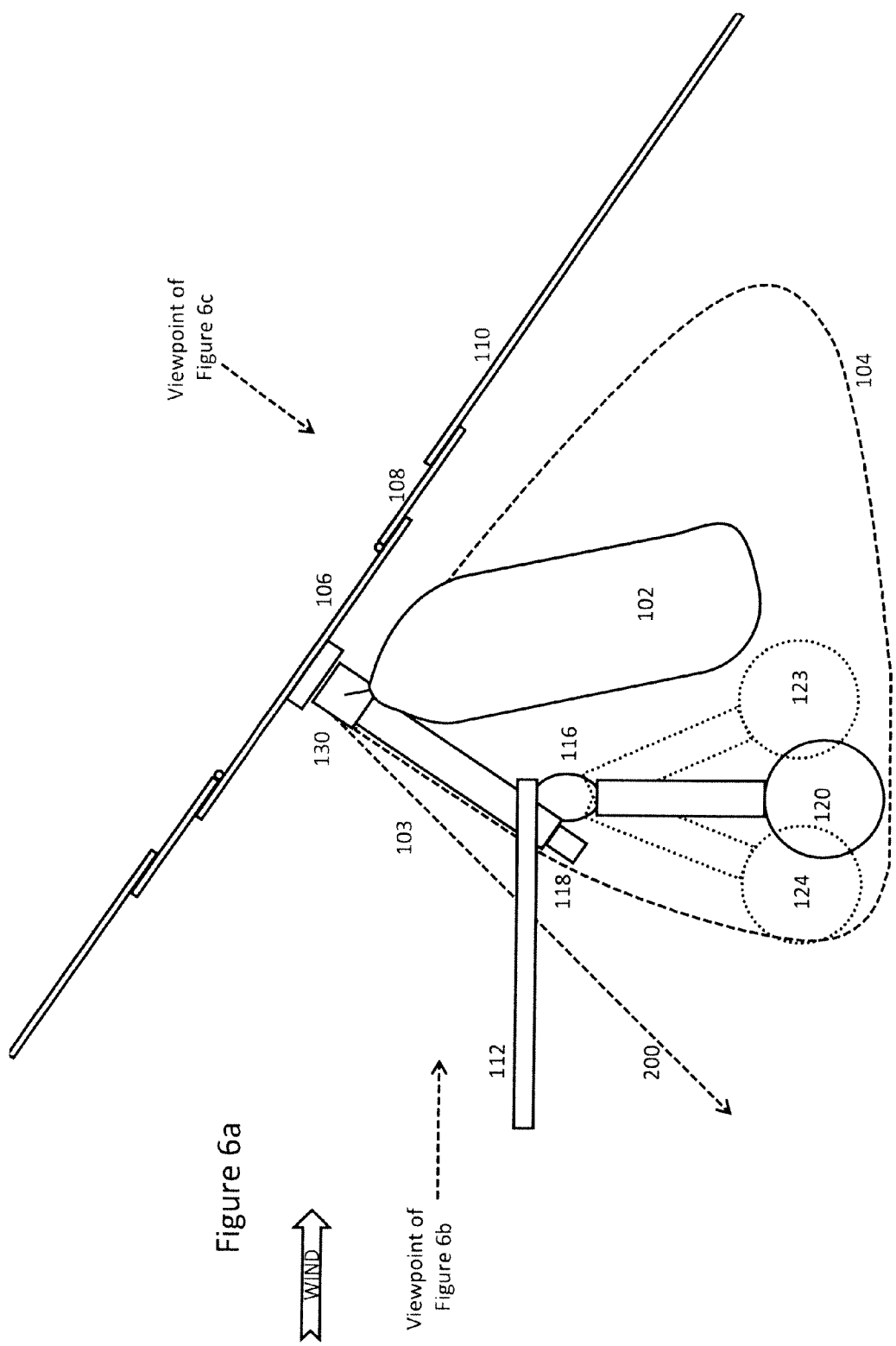

TETHERED GLIDER SYSTEM FOR POWER GENERATION

RELATED APPLICATIONS

The present application claims priority from U.S. Provisional Patent Application No. 61/159,160 filed on Mar. 11, 2009 and U.S. Provisional Patent Application No. 61/247,643 filed on Oct. 1, 2009 which are hereby incorporated by reference in their entirety.

FIELD OF THE INVENTION

This invention relates to energy generation systems, and more particularly to airborne wind energy generation systems.

BACKGROUND OF THE INVENTION

Many systems have been designed and proposed which intend to harvest the stronger and steadier winds hundreds of feet above the surface of the earth. Most propose using some sort of flying wind energy collection device connected to the ground by one or more tethers. These types of systems may be referred to as Airborne Wind Energy Collection Systems (AWECS). Patents have been granted on more than a dozen AWECS starting as far back as the 1800s. Two primary types of systems have been proposed. "Fly-Gen" systems carry a wind energy collection device and an electrical generator aloft, transmitting the produced electricity to the ground via an electrically conductive tether. "Ground-Gen" systems keep the generator on the ground and generally use the flying vehicle to pull the tether resulting in a spinning force being applied to the generator system on the ground.

Both types of systems have been proven to generate electricity, at least for a few seconds, by academic and/or commercial teams. However, no AWECS has ever become a commercially available product, primarily for technological reasons. Generally, prior art systems suffered from two primary technological disadvantages that made the most practical AWECS designs commercially infeasible. More specifically, the strength to weight ratios of tethers and the cost to performance ratio of automation systems were both woefully inadequate.

Twenty years ago, before the advent of extremely high strength to weight ratio synthetic fibers, AWECS with commercial levels of energy production simply were not possible. Steel cable would have been one of a few reasonably priced materials strong enough but disadvantaged if its weight would be more than a hundred pounds per thousand feet. That tether weight added to any flying vehicle's required lift made AWECS impractical. Additionally, steel cable utilized in a ground-gen system—likely performing more than a thousand power strokes every day and close to a million every year—would suffer extreme wear and need perhaps monthly replacement, an added maintenance cost making the system impractical to operate.

Additionally, automation systems and components, such as sensors, servos, and controllers were not developed or included in any meaningful way that met AWECS automation requirements, especially for ground-gen systems, to maintain system flight in the face of changing weather conditions, or to optimize power-stroke cycle of tether pulling and retraction, potentially thousands of times a day. In prior art AWECS, automated control systems did not facilitate commercial feasibility. No systems were known or implemented to allow the system to operate continuously, unattended by humans for weeks and months at a stretch.

Generally, AWECS development has been limited to research projects only. More recently, some of the AWECS known in the art may have some merit as commercially viable systems, but they still lack system requirements necessary for commercial success.

In particular known systems still lack launch and landing methods to get the flying vehicle into the air and back on the ground, automatically, reliably and repeatedly, with no human assistance.

No prior art for AWECS clearly defines this problematic part of the system. Yet even in the most ideal locations, some hours of every month will see winds drop below the speeds necessary to maintain unpowered flight. No known ground-gen AWEC systems define a method of maintaining flight in zero-speed winds aloft nor any control systems to control those flying vehicles to descend and land in such low-wind conditions. Similarly, no landing facility has been described in the prior art, nor any automated method of re-launching when wind conditions improve.

Prior art systems address the issue of system longevity with the assumption that those skilled in the art of designing flying vehicles will use materials light enough, strong enough, and sun and weather resistant enough for commercial feasibility. However, all prior art then describes systems made of fabrics proven by the ultralight aircraft industry to survive only a few thousand hours of exposure before becoming dangerously weakened. Similarly, prior art of ground-gen AWECS describes use of reels and/or capstans for the tether, with no recognition that more than 1000 power cycles every day is almost two orders of magnitude beyond what these standard line management systems handle in any other applications. Even the most recent high-tech ropes, wrapped around a capstan with a ton of force applied, cycled a few hundred feet back and forth, will shred from friction after a few thousand cycles. The prior art does not address longevity—the ability of the system to operate for many years with minimal downtime and replacement costs.

Some of the prior art describes systems requiring strength to weight ratios attainable only with the most advanced composite materials. These composites increase material costs high enough that the system purchase price then requires more than a decade of payback period—un-sellable in the renewable energy market. Alternatively, the prior art describes fabrics, as noted above, requiring replacement after only a few months of operation, thus increasing maintenance costs beyond commercially feasible levels. Similarly, high-friction capstan ground-gen systems may require tether replacements every few days, weeks or months, again inducing maintenance and replacement costs making the system commercially infeasible.

The prior art does not disclose or suggest broad flight envelopes—the ability for the system to maintain flight and energy production in the face of a broad range of wind and weather conditions. The prior art generally describes the flying vehicle in the most simple terms, leaving the details to those skilled in the art. The unmanned, autonomous wind-supported tethered flying structure required to operate in the broad range of wind speeds and weather required, has yet to be described. Unmanned Aerial Vehicles (UAV), some with a considerable amount of autonomy, exist today. UAV auto-pilot control systems are now commercially available off the shelf. However, tethered flight involves an entirely different set of stability algorithms. Increasing the complexity of the task is the requirement to have the AWECS remain aloft as long as possible—more than 90% of the time—by definition in wind and weather conditions UAVs will not risk operating within. Flight in wind speeds ranging from a gentle breeze to near hurricane force, and occasional gusts between the two extremes, is the real-world environment of commercially viable AWECS. Yet no prior art describes a flying vehicle able to cost-effectively maintain that broad a flight envelope.

The US Federal Aviation Administration (FAA) is an integral consideration in the design and deployment of any viable AWECS in the US. The FAA has defined rules concerning 'moored' flying objects, rules likely to be broadened to accept AWECS flying at higher altitudes and continuously. However, the requirement for making the moored object's tether visible to aircraft pilots is not likely to be dropped. On the contrary, with tether lengths many times the current allowable limits, making the tether highly visible to aircraft pilots will take on increased importance. Tethers on ground-gen AWECS are particularly problematic—experiencing more than a ton of load while extending and retracting possibly hundreds of feet with each power stroke. Flags directly mounted to the tether risk gumming up the works at the ground generation system. At a minimum, flags would require frequent replacement from the wear induced by such a torturous route. No prior art has described this critical piece of the AWECS puzzle.

Further, the high-strength tether lines AWECS require are particularly slippery. Slippery tethers are not a problem for fly-gen AWECS using just a reel. For ground-gen AWECS utilizing a capstan to capture the torque and motion of the tether, friction between the tether and the capstan is critical, but also damaging. Wrapped around a capstan perfectly functional for nylon or polyester lines, some lines will not only slip with the same number of coils, but with enough tension applied to spin the capstan, the coils will wrap atop one another. This coil to coil contact and resulting friction prematurely wears the tether, fraying and weakening it quickly enough to require replacement too frequently for commercial viability. The prior art makes no mention of, nor offers any solutions to the problems introduced by high-strength but slippery tether lines.

SUMMARY OF THE INVENTION

The present invention provides a ground-gen type of Airborne Wind Energy Collection System (AWECS) (referred to herein as the "Energy Glider System"). The Energy Glider system is comprised of three primary components; the flying vehicle called the "energy glider," the ground-based launch and landing platform called the "aerie," and the ground-based electrical generation, reel, tether and control system and housing called the "energy trailer."

In an illustrative embodiment system sizes as described are for power generation of less than 100 kWs with each power stroke. However, other system sizes are contemplated within the scope of the invention. When the system is ready for operation and the winds aloft are adequate, the Energy Glider launches into the air and quickly ascends via lift provided solely by the wind, to operational altitudes. As the glider ascends, the generator varies its resistance to the tether pull in order to keep a constant tether load on the glider. At the peak of its flight altitude in the illustrative embodiment, no higher than 1200 feet above the ground in the US to remain within FAA designated "uncontrolled airspace," the Energy Glider slows then stops its ascent. It then gradually pitches downward and begins a descent of a few hundred feet while the tether is reeled in at a matching speed to keep a constant load on the Glider. As the glider approaches its minimum power-stroke altitude, it slows then stops and gradually begins a climb, again powered solely by the wind, pulling the tether with more than a ton of force at increasing speeds of more than a few feet per second. When the glider approaches its maximum flight altitude again, it slows then stops and again descends. This power-stroke cycle repeats automatically, continuously until the winds aloft decrease below practical power-generation levels (greater than about 16 mph) or increase to hurricane force. In those cases or when required to descend for monthly maintenance, the glider descends all the way to rest atop its cradle on the Aerie, the tether being reeled in to maintain a constant load on the glider during its descent.

BRIEF DESCRIPTION OF THE DRAWINGS

FIG. 2b is a side view of the glider cradle showing its position just before the glider landed atop the cradle;

FIG. 2c is the same view as FIG. 2b but with the glider in position for launch;

FIG. 2d illustrates the glider pitched slightly into the wind to slow the rotor;

FIG. 2e illustrates the glider pitched horizontally for least wind resistance for spin-up;

FIG. 4a is an overhead schematic view of the tether flag keeper mechanics;

FIGS. 4b-d are cross-sectional views of key points within the flag keeper flow path;

FIG. 4e includes various views of tether flag clips;

FIG. 5a is a side schematic view of the major components in the tether path within the power trailer;

FIG. 5b is a more detailed overhead schematic view of all the major components of the power trailer;

FIG. 6a is a port side cutaway view of the glider, also showing the viewpoints of FIGS. 6b and 6c;

DETAILED DESCRIPTION

Figure 1A:
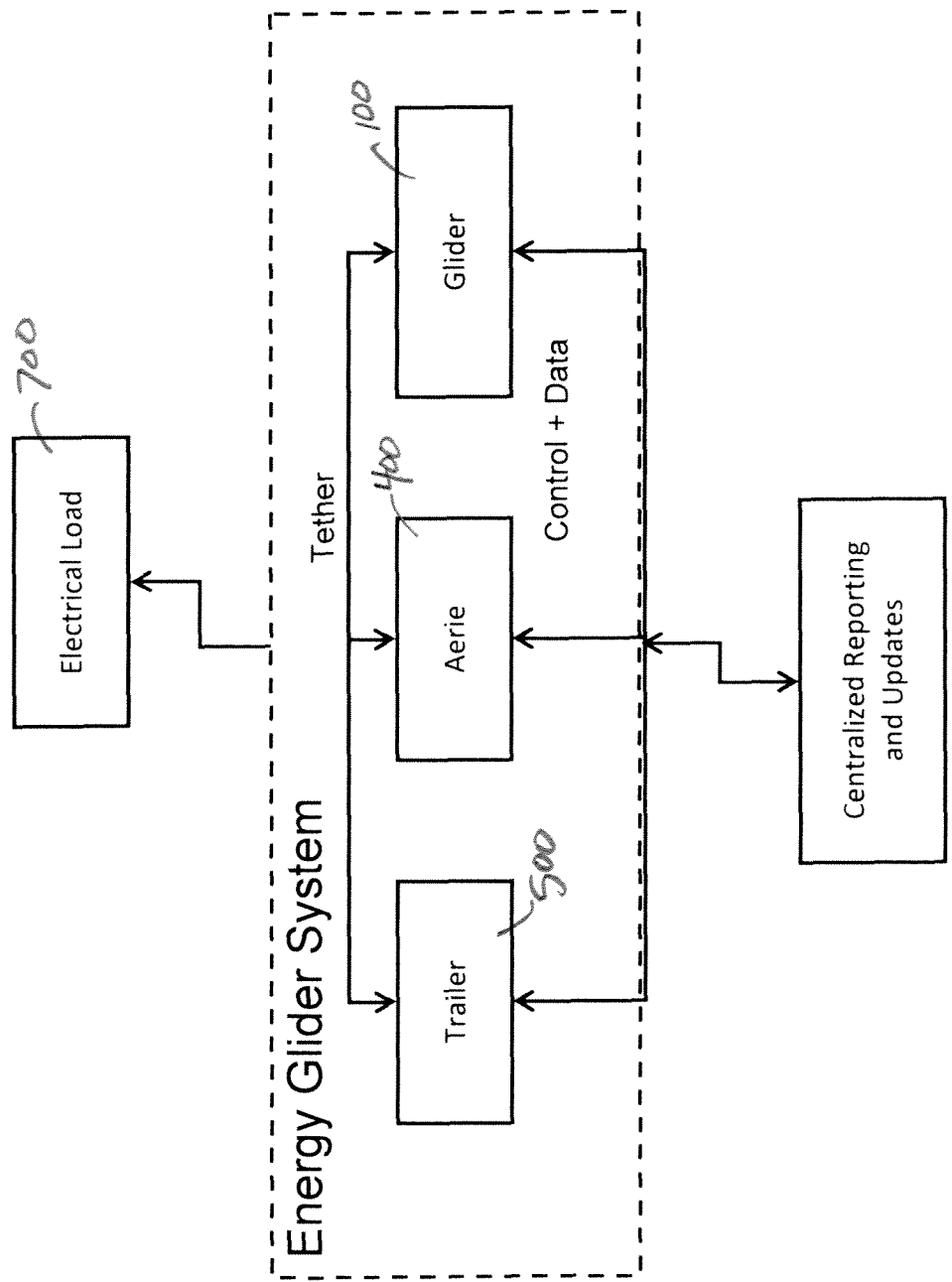
FIG. 1a illustrates a complete Energy Glider system in block diagram form.

An illustrative embodiment is described hereinafter of an Energy Glider system for production of commercial-scale electricity—less than 100 kW of peak power generated with each power stroke. As illustrated in FIG. 1a the energy glider system has three on-site major components: a trailer 500; aerie 400; and glider 100 with an output to an electrical load 700. To be commercially viable in large quantities, the system also requires one off-site component—centralized reporting and updating.

Figure 1B:
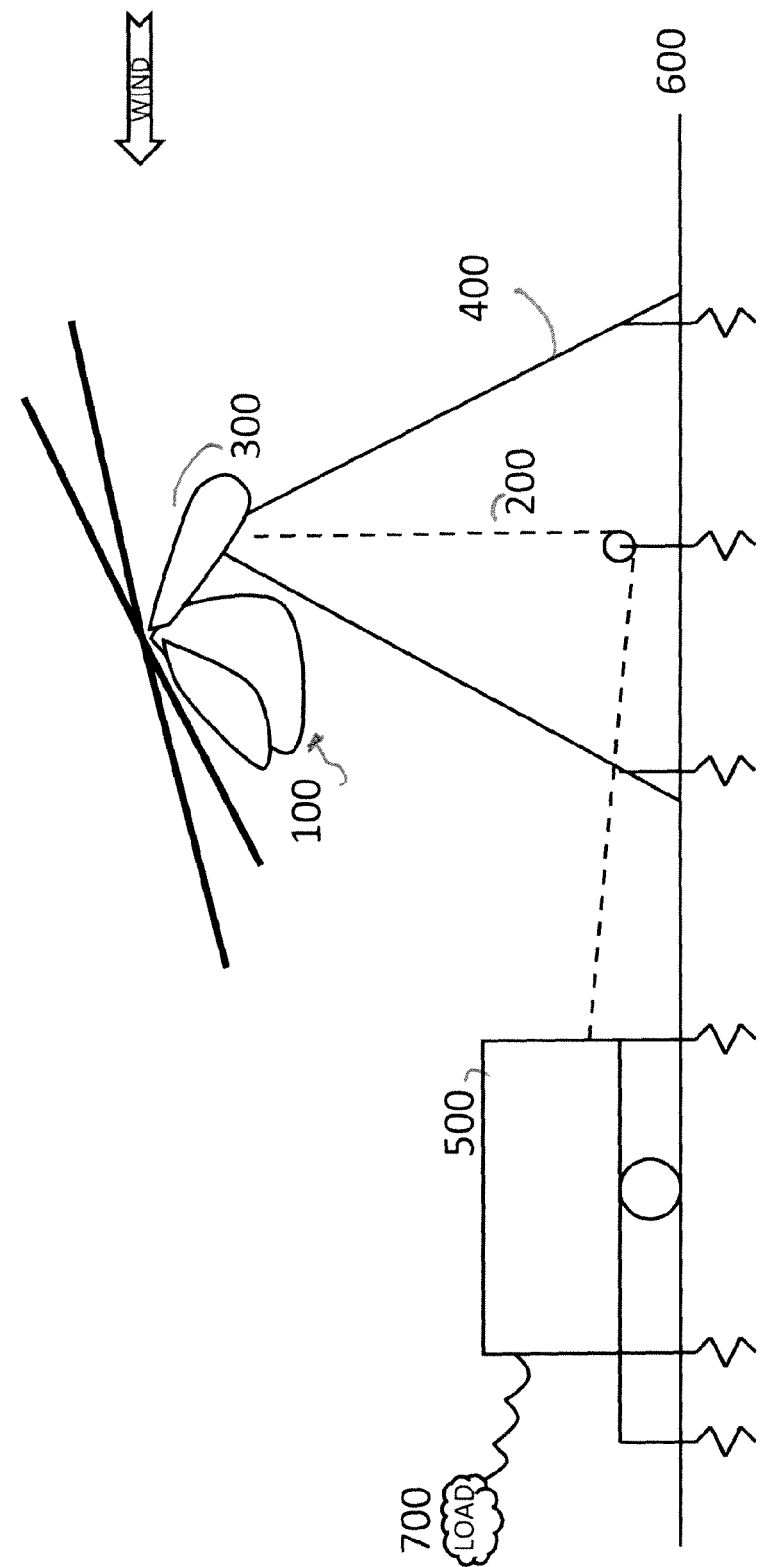
FIG. 1b illustrates the complete Energy Glider system.

FIG. 1b illustrates the physical relationship and approximate relative sizes between the three major components—trailer 500, aerie 400, and glider 100, while resting on its cradle 300 atop the aerie 400. A tether 200 connects the glider 100 through the aerie 400 to the trailer 500. The output of the trailer is electricity connected to some electrical load (not shown). The aerie 400 and trailer 500 rest on the ground 600 and are anchored to the ground with multiple ground-anchors, such as of the types used for guy-wires on telephone poles.

Figure 1C:
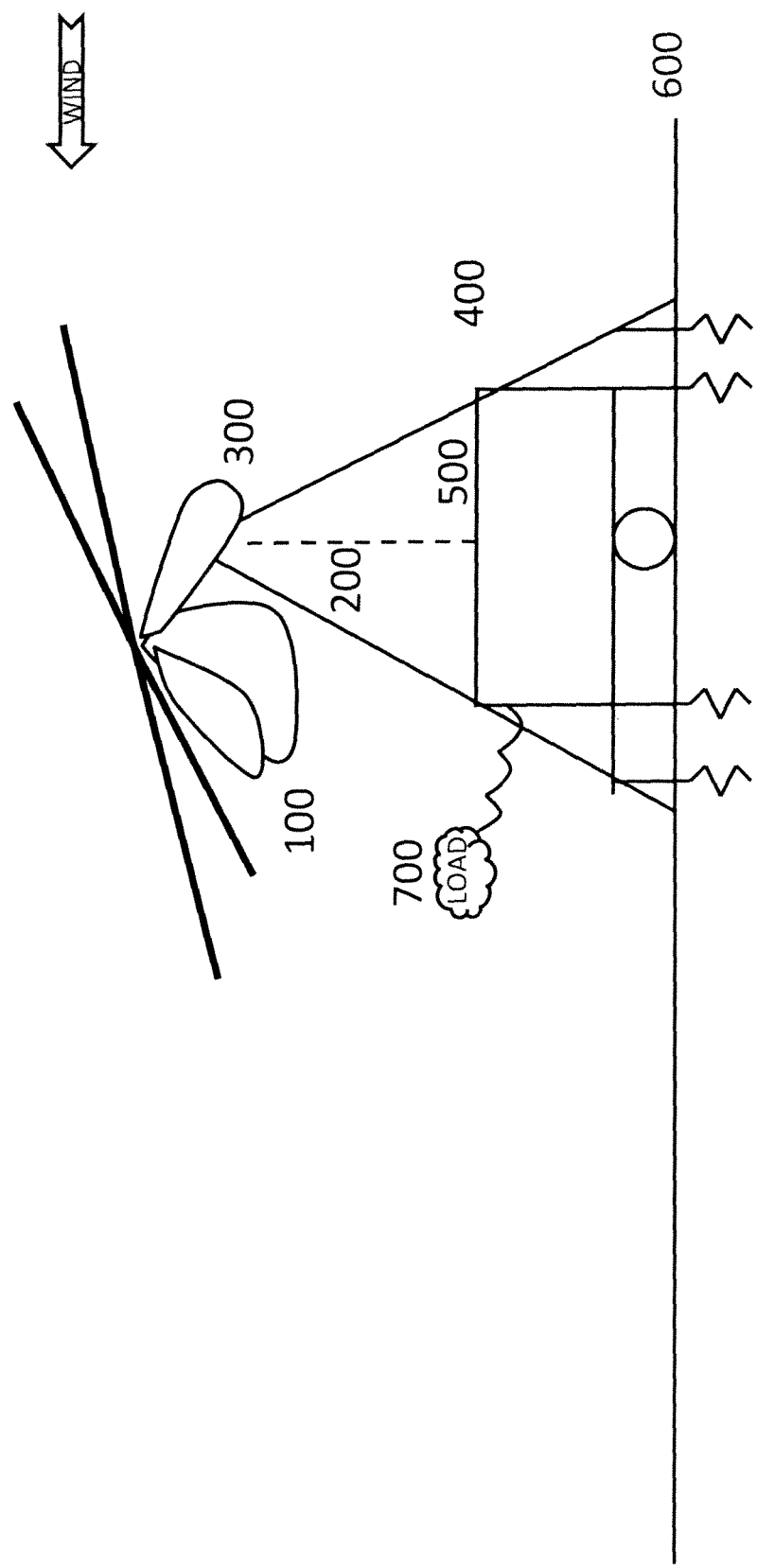
FIG. 1c illustrates an illustrative embodiment of the Energy Glider system with the energy trailer positioned directly beneath the aerie.

FIG. 1c illustrates an alternative physical configuration of the system with the trailer 500 mounted directly beneath the aerie 400.

Figure 1D:
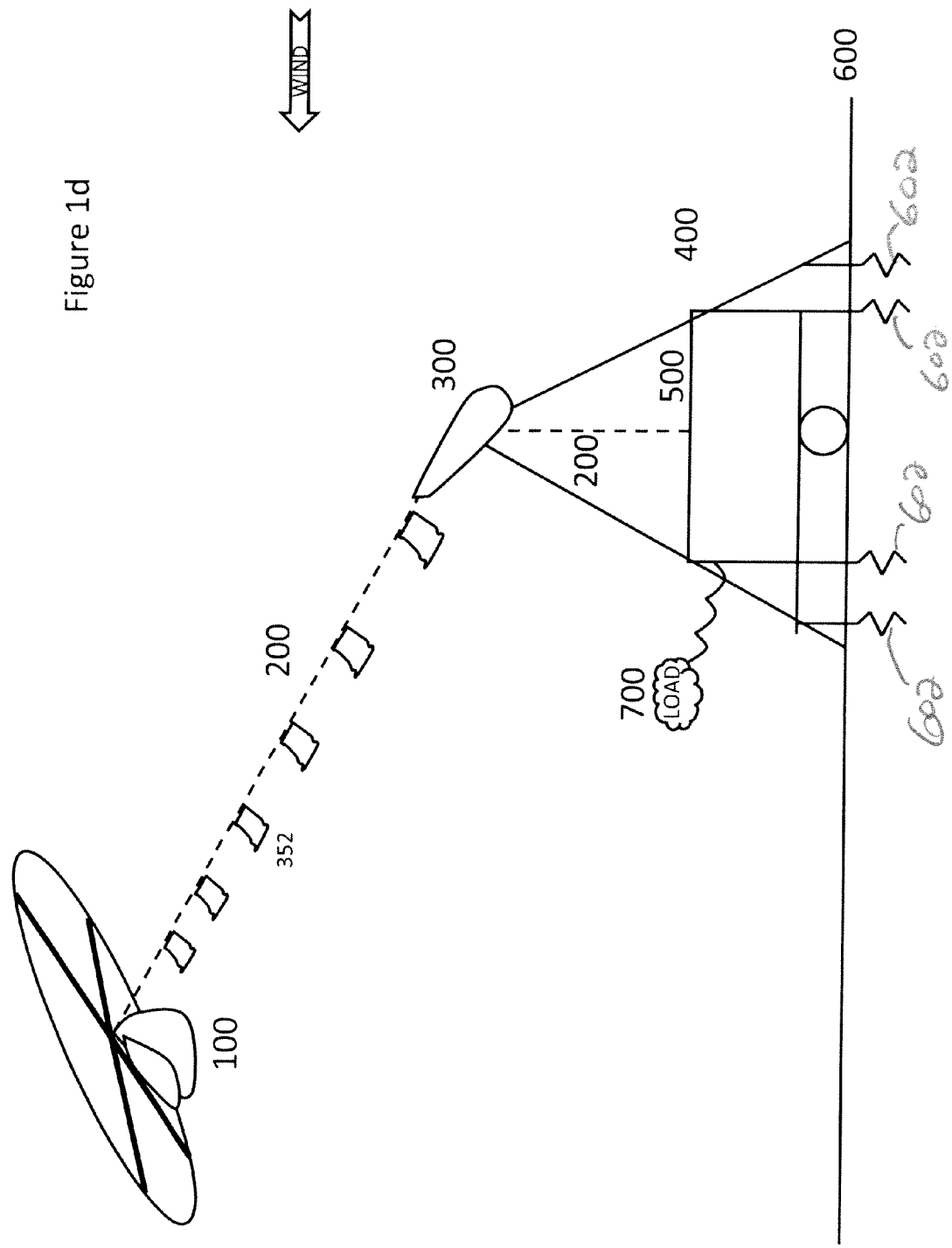
FIG. 1d illustrates the complete Energy Glider system with the glider deployed from the glider cradle.

FIG. 1d illustrates the glider 100 flying at the end of the tether 200 with tether flags 352 deployed along its length.

Figure 2A:
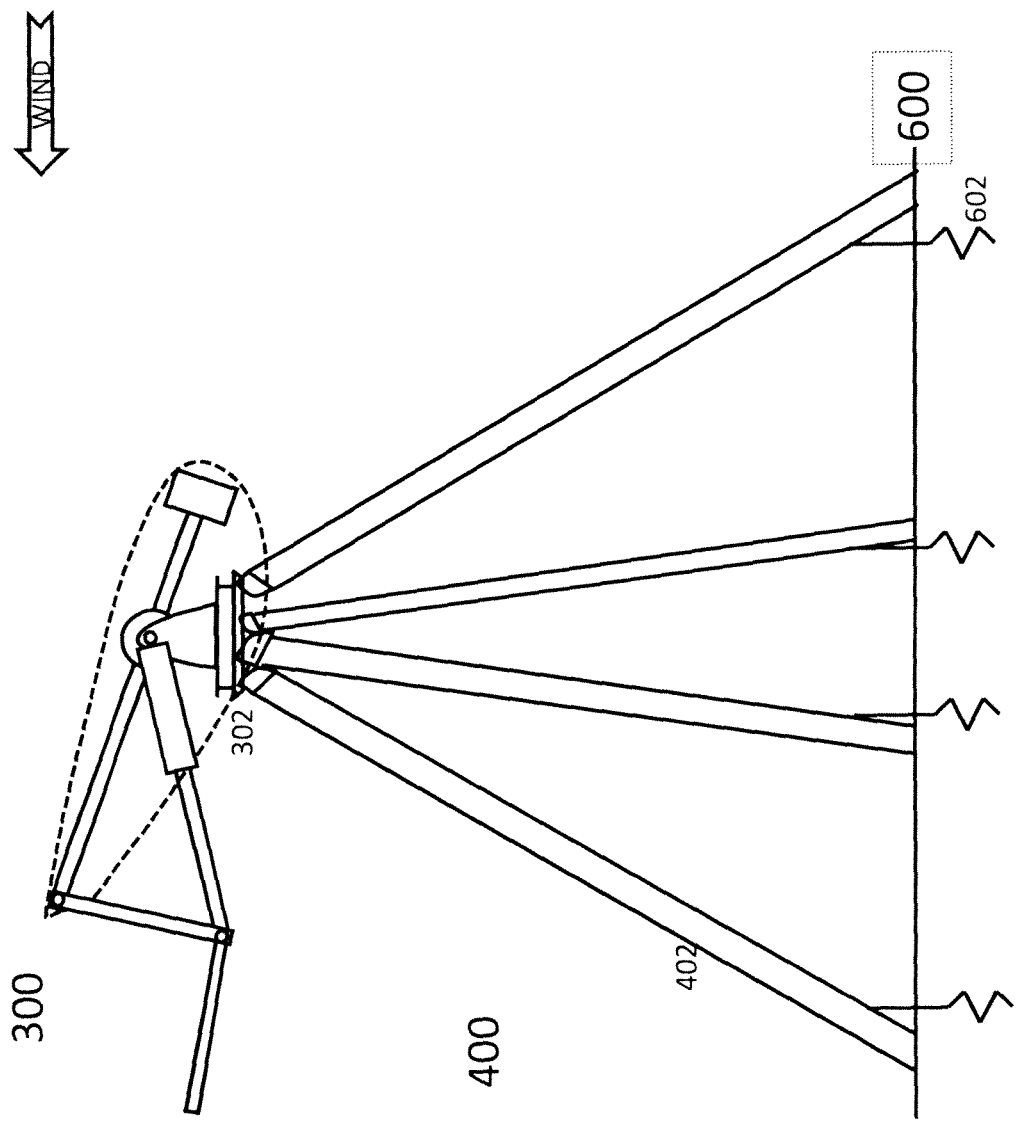
FIG. 2a is a more detailed view of the aerie.

The aerie illustrated in FIG. 2a is built of four or five legs 402 supporting a horizontal turntable assembly 302 in this illustrative embodiment at least fifteen feet above the ground to provide safe clearance from the rotor blades to people on the ground. Each leg 402 is anchored to the ground 600 using suitable ground anchors 602. Each leg 402 and all other aerie components described below, is built of sufficient material of sufficient dimensions to support a static supported weight of approximately 1000 pounds and dynamic forces as high as 5,000 pounds pulling from the top of the cradle 300 (described below) potentially at angles as low as 25 degrees above the horizon. The turntable assembly 302 is of any design suitable for the task—ring, rail and rollers also of sufficient materials and strengths to accommodate the above described forces.

Atop the turntable 302 is mounted the cradle assembly 300. This assembly 300 is also built of suitable materials and methods to withstand the forces described above. The turntable 302 has a large opening in its center through which the tether 200 can pass freely without touching the sides.

Various rpm, contact, temperature and other electrical sensors, servos and control loops, not shown, feed their data or receive commands from a trailer microcontroller which is in radio communication with a glider microcontroller.

As discussed hereinafter, FIGS. 2b through 2e shows various positions of the glider and cradle together.

Figure 2F:
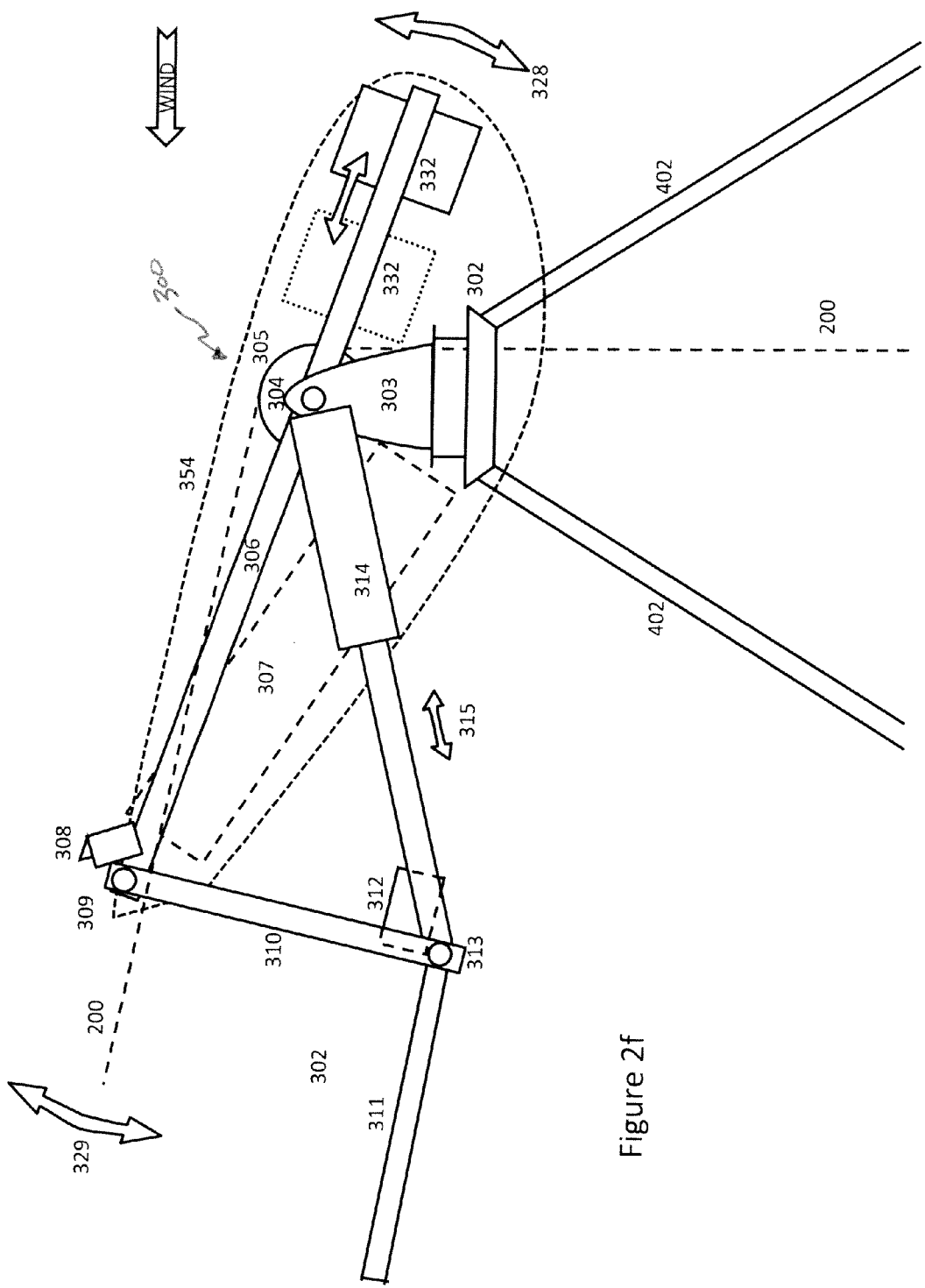
FIG. 2f is a directly overhead isometric view of the glider mated to the cradle assembly while in spin-up position.

FIG. 2f illustrates the entire cradle assembly 300 atop the aerie 400. Aerie legs 402 support the turntable assembly 302 upon which the entire cradle assembly 300 is free to rotate 360 degrees. Mounted to the turntable 302 is the cradle assembly comprised of a roughly triangular shaped structure 303, which supports a teeter shaft 304 upon which the entire cradle assembly 300 is free to move up and down as indicated by arrows 328 and 329. Mounted to the teeter shaft 304 is a main tether sheave 305 which the tether 200 passes over the top of to come out the aft of the cradle assembly 300.

Also mounted to the teeter shaft 304 of the cradle assembly 300 is a teeter structure 306. Connected to the teeter structure is a tether flag keeper 307, described in detail below; pre-rotator motors (2) 308 similar in style, size and function to a variety of commercial automobile starter motors; the end shaft 309 from which hangs the end links (2) 310, which supports the oxbow 311, at the center of which is the glider clamp 312 not shown in detail. End links 310 and oxbow 311 connect at the same hinged point 313 as one end of rocker-jacks (2) 314 which move in or out as indicated by the arrow 315. The other end of the rocker jacks 314 connect to the teeter shaft 304. While the aerie legs, turntable, teeter shaft and tether sheave should withstand up to 5000 pounds of force, the rest of the cradle assembly experiences considerably lesser forces.

A counter-weight 332 made of suitably dense materials is mounted on a sliding rail controlled by a quick motion device, such as a solenoid, servo and pulley, or screw-jack—not shown, to move the rail forward and back from one extreme to the other in less than a second. The weight must be sufficient to closely balance the cradle assembly with the glider landed, then very quickly rebalance the cradle assembly with the glider aloft. The entire cradle assembly other than the cradle itself, is covered on all sides except the bottom below the tether flag keeper 307, by a thin aero-shell 354 designed to minimize wind turbulence at the glider lifting surfaces.

Figure 2G:
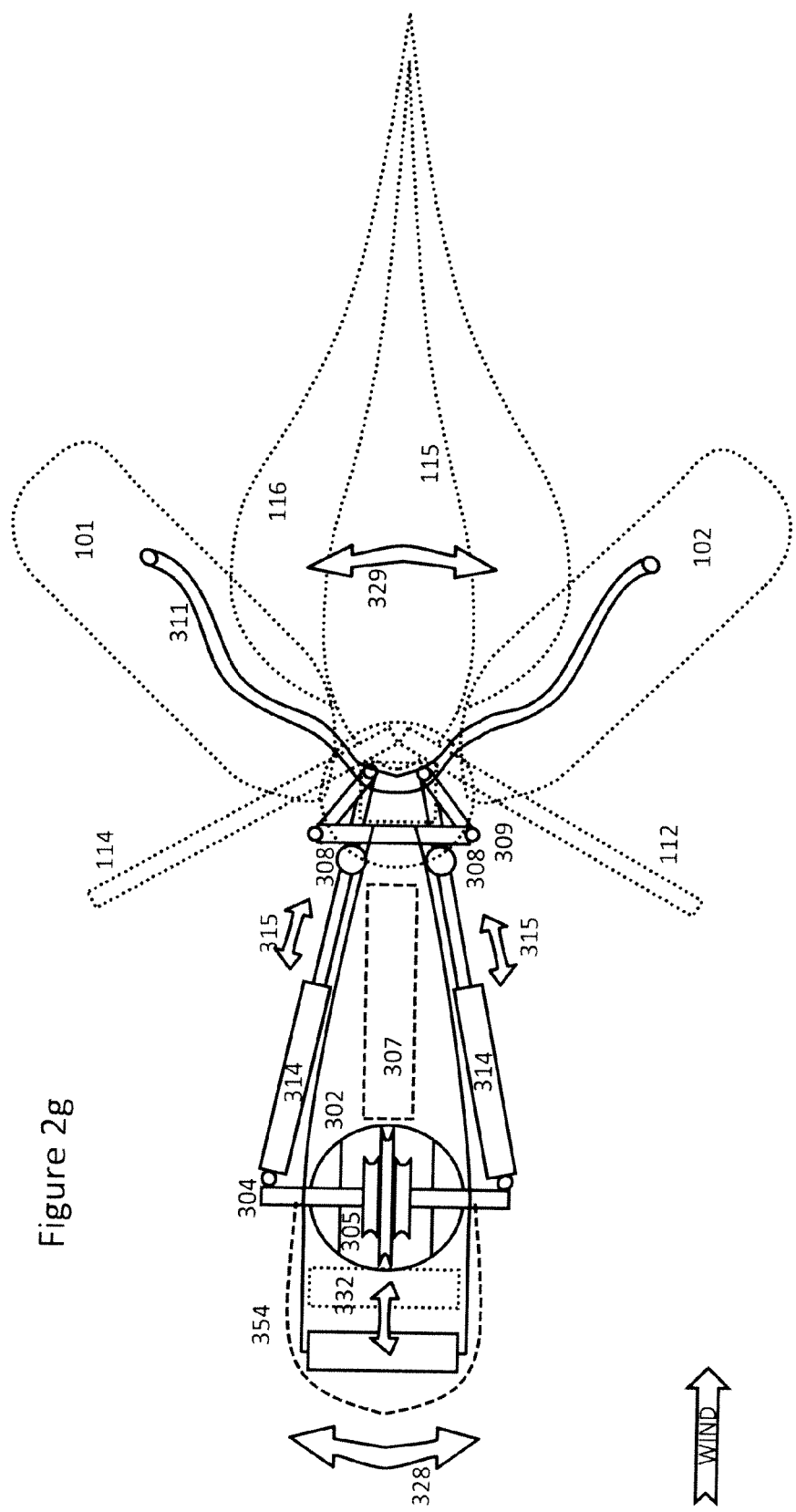
FIG. 2g illustrates the same mating as FIG. 2f, but from behind the glider.

FIG. 2g is an overhead view of the cradle assembly with the glider mated to it in spin-up position. The turntable 302 is the center of rotation for the entire assembly as shown by arrows 328 and 329. Atop the turntable is the teeter shaft 304, supporting the main tether sheave 305. The tether flag keeper 307 extends aft toward the pre-rotator motors (2) 308, next to the end shaft 309. The oxbow 311 mates closely with the glider aero-shell at cross-section 115. Glider aero-shell cross-section 116 is a close fit for a broader part of the oxbow. The oxbow is made of a strong but flexible material, able to flex in response to impacts from the glider. When in the cradle, the glider elevons 101 and 102, are above the oxbow 311. The glider landing arms 112 and 114 guide the glider into the center of the oxbow 311 if it is rolled off center by gusts during landing. Rocker jacks (2) 314 extend or retract the oxbow 311, leaning the glider into or away from the wind. The cradle counter-weight 332 slides along rails to balance the entire cradle assembly while the glider is landed and after the glider is airborne. The entire cradle assembly is covered by an aero-shell 354.

Figure 2H:
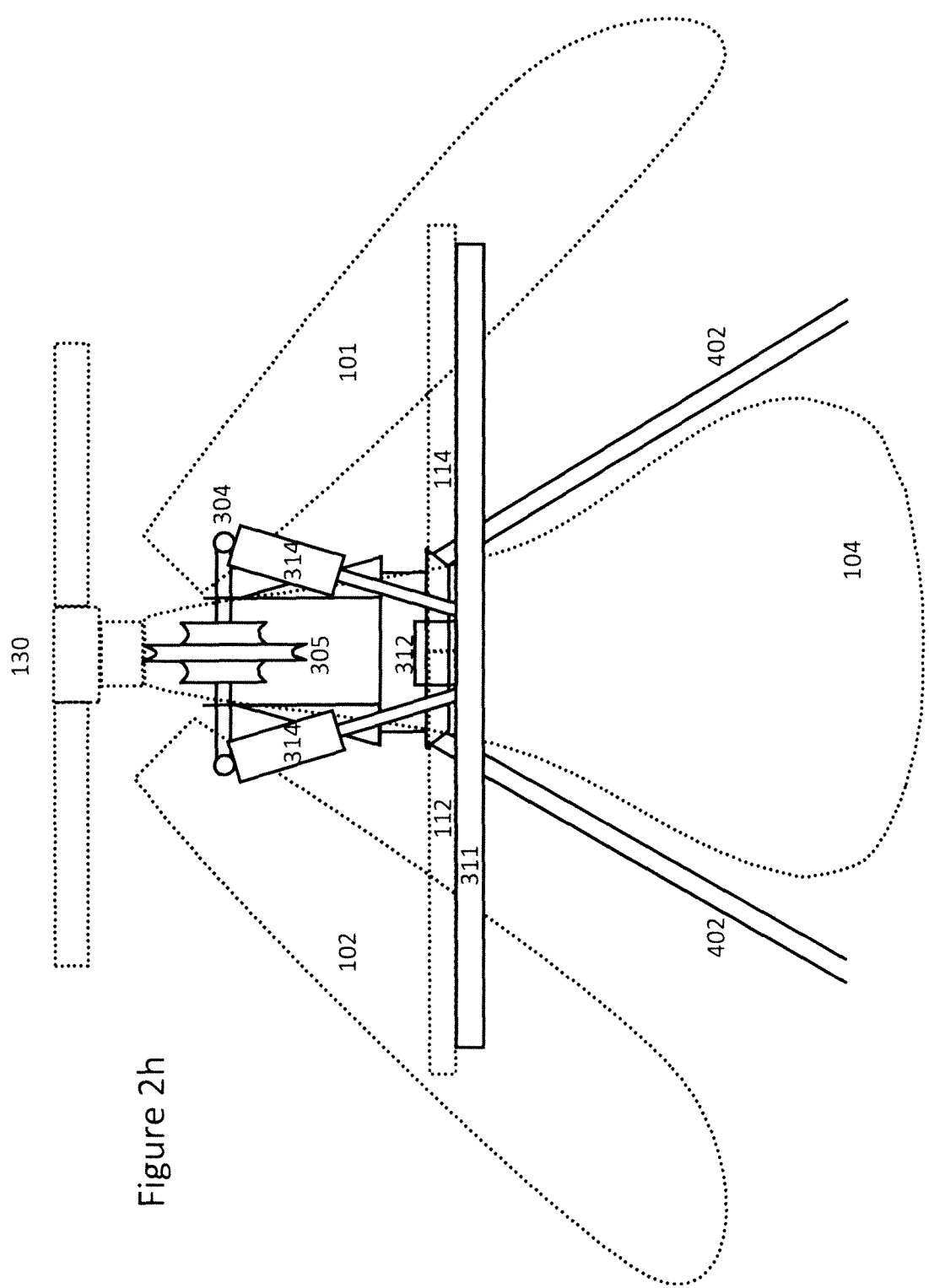
FIG. 2h illustrates a starboard side isometric view of the entire cradle assembly.

FIG. 2h is a isometric view upwind from behind the glider 100 while the glider 100 is mated to the cradle assembly 300 components. The glider 100 is drawn in dashed lines with the glider aero-shell 104, the elevons on port 102 and starboard 101, the landing arms port 112 and starboard 114, and the rotor head 130 above. The Aerie legs 402 support the cradle assembly 300 above. The main tether sheave 305 is disposed on the teeter shaft 304, at the ends of which are hinged the extension jacks (2) 314 holding the oxbow 311 in place and the glider clamp 312 (details not shown in this illustration).

Figure 3A:
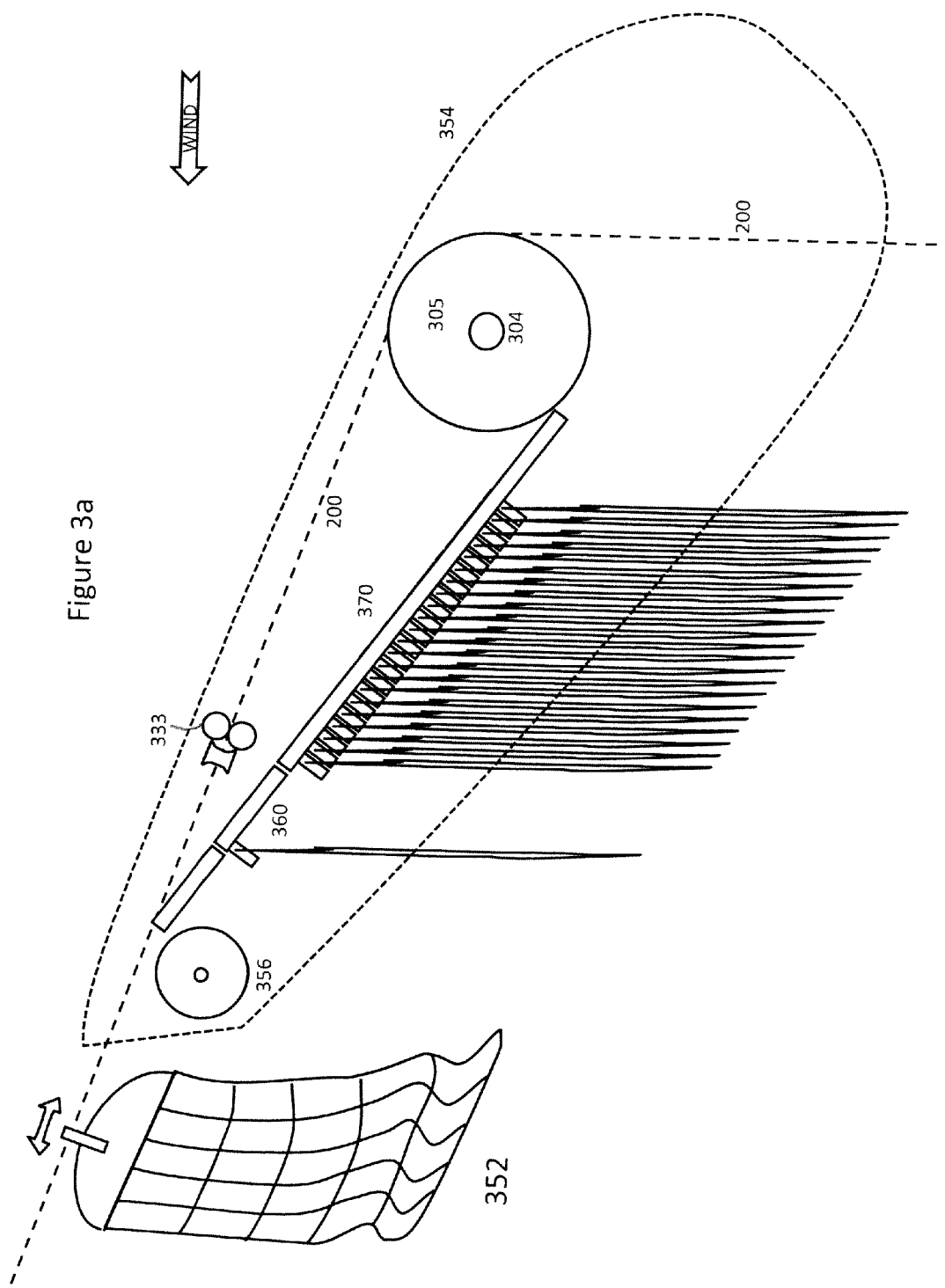
FIG. 3a is a cut-away side view of a tether flag keeper within the cradle assembly showing a flag just outside the keeper, and a number of flags stored within the keeper.

FIG. 3a is a transparent isometric starboard side view through the aero-housing 354 of the cradle assembly 300 showing the flag keeper 307 assembly. This entire flag keeper assembly 307 is connected to the main teeter structure 306 (not shown here). The angle of the entire cradle assembly 300 is determined by the tether 200 angle to the glider 100 riding on a collection of pulleys 333. The cradle assembly 300 is balanced by the counter weights 332 (shown in the view of FIG. 2f), around the teeter shaft 304 to which the main tether sheave 305 is also attached. Flag assemblies 352 are connected and disconnected to/from the tether 200 by the tether flag keeper assembly 307. The furthest downwind component is the clip squeeze rollers 356. A half tether-speed clip turn belt 360 facilitates movement of flags from the flag storage belt 370 onto the tether 200.

FIG. 4a is an overhead isometric view of the tether flag keeper 307 mounted within the cradle assembly 300 to the main teeter structure 306, not shown here for clarity. The tether flag keeper is comprised of three sections delineated as a first section 356, second section 360 and a third section 370. Common components include rollers 386, mounted on springs 396, with suitable long-wearing high-friction belts around them 398, 388, 394, 390. All components of the flag keeper experience as many as a million cycles a year so must be designed of both long-lasting materials and for easy maintenance and individual replacement.

The clip squeeze rollers 356 comprise the first section and a cross-section 382 of their operation is illustrated looking down the tether path (FIG. 4b), showing the cross-section shape of the rollers and their approximate angle that squeezes the flag clips 460 as they come between the rollers.

The second section 360 is three distinct belts, two on one side 390 and 394 separated by a spring-mounted arm that extends partway into the central path between the belts. Belt 388 runs continuously the entire length of second section 360. Second section 360 turns each clip and its attached flag ninety degrees for storage under second section 370. The belts in second section 360 move at half the speed of the tether, to quickly pull or push clips off or onto the tether and to or from third section 370. FIG. 4c illustrates a cross-section 384 at the beginning of this section with the flag clip 460 held between the belts.

The third section 370 is two substantially identical belts on either side of the central path. FIG. 4d illustrates a cross-section 386 that shows the flag clip rotated 90 degrees and showing the flag holder broadside. Third section 370 moves at a belt speed in ratio with the tether that releases or accepts one clip from section 360 for every fifty feet of tether withdrawn or retracted. All three sections 356, 360 and 370 are spun by a transmission (not shown) driven by the main tether sheave 305. As the tether 200 is withdrawn, the sheave 305 rotates in one direction, driving the transmission that rotates the belts in the second and third sections 360 and 370 to expel clips to be attached to the tether 200 at the appropriate spacings on the tether 200. The default design is for the US FAA requirement of a tether flag every fifty feet. Conversely, as the tether is retracted back into the Energy Trailer, the main tether sheave drives the transmission to collect clips and tether flags as they come in.

FIG. 4e is a collection of views of the flag clip 460, looking much like a standard American clothes pin, but made of solid aluminum or other strong, dense, lightweight and easy to mold material. The clip is comprised of two identical halves shown from the top 340, the side mated together 342 and the side with a spring 344 squeezed to open the clip and allow the tether 200 to pass between the jaws. A top cross-section view 346 shows the interlocking section that keeps the tether within the clip mouth. The steel spring is substantially similar to clothes pin springs with a central coil and two extending arms with bent ends to clamp the clip halves together. FIG. 4e presents various views of the flag clip 460 configuration including a top view 341, side view 343 and end view 345.

FIG. 5a is a side view of the tether 200 path within the Energy Trailer 500 through the major tether-contacting components. First the tether runs between four small dog-bone pulleys 518 to a capstan drum 516. The tether 200 wraps half around the capstan drum 516 and then extends to a capstan guide pulleys 520. After a suitable number of wraps around the capstan drum 516 and guide pulleys 520—a number primarily determined by the tether diameter and the material the capstan is made from—the tether 200 passes between another set of dog-bone pulleys 509 and onto a spring-mounted tension sheave 508 before running through a line keeper of serpentine or other suitable design connected to a high-speed reel able to maintain a line speed of more than 30 feet per second. All materials are either aluminum, stainless steel or high density and strength plastics. Loads on the tether 200 may momentarily be as high as 5000 pounds so all materials must be able to repeatedly withstand or exceed that amount of force. The Energy Trailer 500 components also experience as many as a million cycles a year requiring extreme strength and durability as well as easy maintenance and individual replacement.

FIG. 5b illustrates the same tether 200 path through the Energy Trailer 500 with the power generation equipment also shown. The wraps around the capstan 516 are positioned as a function of the angle of the capstan guide pulleys 520. The position of the dog-bone pulleys 509 allow free tether movement to the moving tension sheave 508 feeding the tether across the face of reel 502 through the line keeper 506.

A line keeper transmission 504 is positioned between the reel 502 and the line keeper 506 to synchronize the line keeper with the reel 502. A synchronization transmission 512 between the reel 502 and the capstan 516 keeps the two synchronized utilizing a spring-mounted tension sheave 508 to take-up any line difference occurring from multiple tether layers around the reel. This configuration ensures the reel 502 and capstan 516 spin at the same speed, with no over-rotation from either, when the tether 200 is pulled or retracted.

A mechanical brake 546 on the capstan shaft is able to keep the entire system from rotating. A transmission 514 is disposed between a separately excited motor/generator 540 similar in function to a D+D Motor Systems Inc, model ES-32B-50, and the capstan 516. A regenerative braking and separately excited motor controller 542, similar in function to a Curtis model 1268 SepEx, is connected to a bank of batteries 544 which are in turn connected to the DC-AC inverter 550, feeding out to an electrical load 700.

The Energy Trailer further includes various rpm and electrical sensors, control loops and relays (not shown in FIGS. 5a and 5b), all centered around the trailer microcontroller which is in radio communication with the glider microcontroller.

Figure 5C:
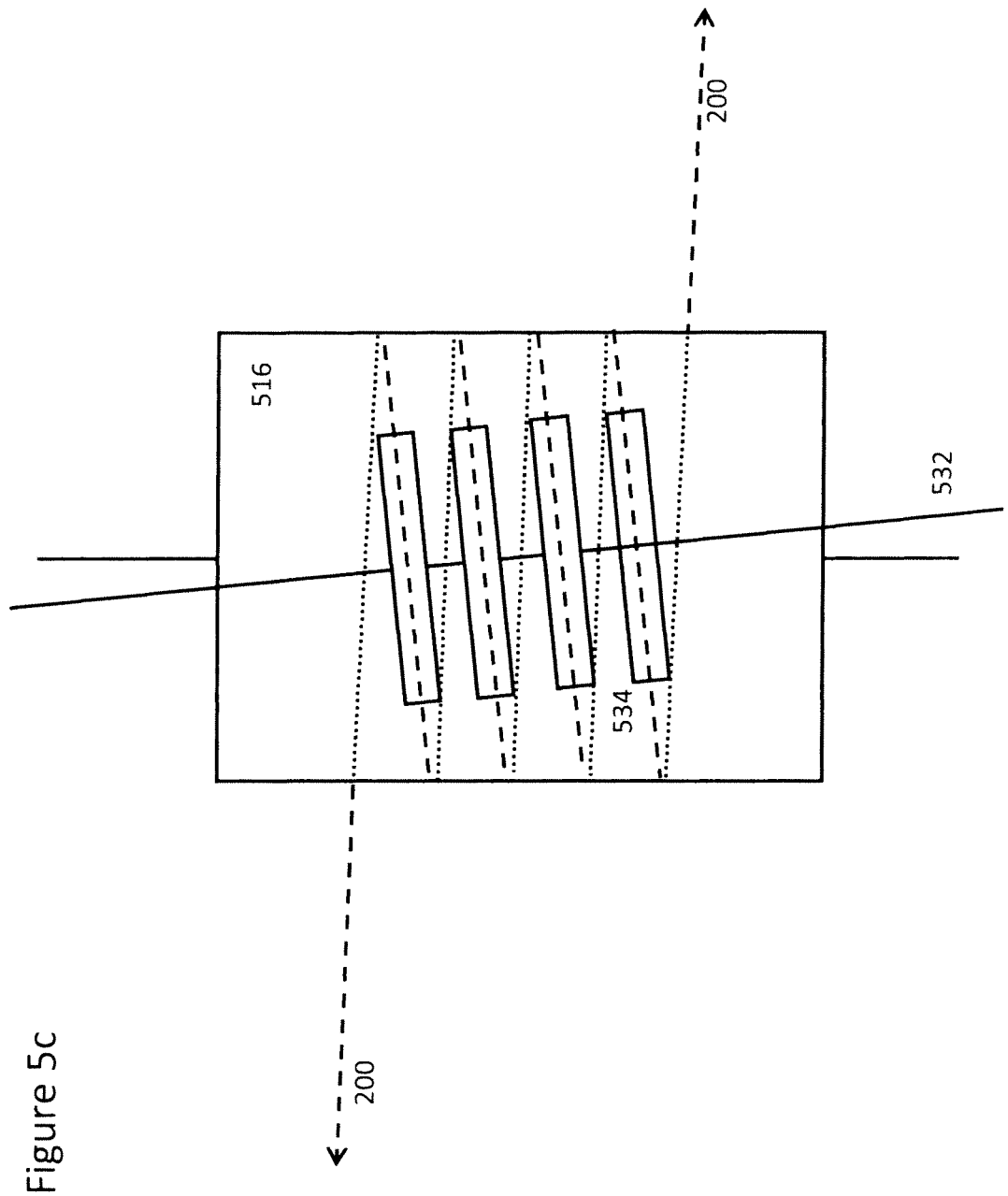
FIG. 5c is a detailed drawing illustrating the angles involved with the low-friction capstan assembly.

FIG. 5c is an overhead view of the capstan 516 and capstan guide pulleys 534 illustrating the angle between the two ensuring each wrap of the tether 200 does not touch the other. The capstan guide pulleys 534 can all be mounted to a suitably strong shaft held away from the capstan 516 by a suitably strong structure.

FIG. 6a is a port side view of the glider 100 showing the approximate angle of the tether 200 during flight and its approximate connection to the rotor-head base 130. This view also shows the position of the port elevon 102 connected to the rotor-head base 130, and its approximate shape. Also visible is the aero-body shape 104 as it draws toward the stern as a vertical stabilizer. A dampened payload pendulum 120 is configured to move between extreme forward 124 and aft 123 positions. A dampening two-axis joint 116 is disposed between the pendulum 120 and a central beam 103. This joint can be as simple as a stiff and thick manila rope, or much more complex with adjustable dampening. An on-board generator 118 is shown extending from the bottom of the central beam 103. A torsion tube (not shown) is contained within the central beam 103 which rigidly connects the rotor-head spindle with the generator 118 such that the generator and the spindle and the rotor blades all spin at the same speeds.

Figure 6B:
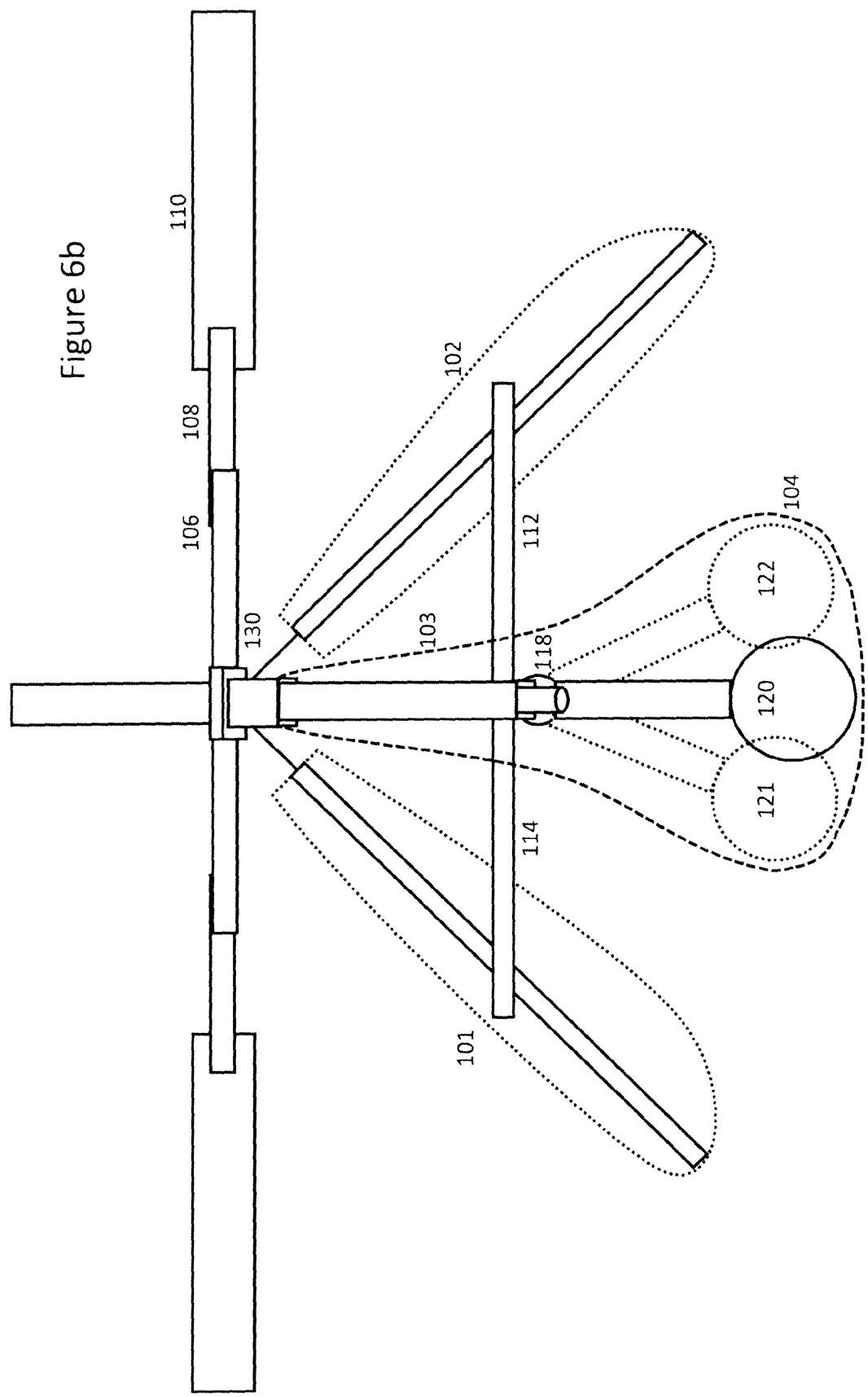
FIG. 6b is a glider front (upwind) transparent isometric view of the glider.

FIG. 6b is an upwind isometric view of the glider showing four rudimentary rotor blades 110. The rotor blades 100 are manufactured of suitable materials and methods common to the gyro-copter industry. Any number of blades more than one but less than six will be suitable depending on the power production required and the anticipated flight altitudes of the glider. The blades are connected via known methods to hinged extensions 108, which are connected to a central, in this case "quad" flybar 130. Industry-standard designs are suitable for all of these components. The structure is configured for changing the angle of incidence of all rotor blades substantially simultaneously. Any of a number of previously developed known solutions will be adequate for this function. The flybar 106 is connected to the rotor head 130 via structures illustrated in FIG. 8 and described hereinafter. Also connected to the rotor head base are elevons on the port 102 and starboard 101 sides, each able to pitch up and down around their center of lift point, connected to the rotor-head base. The central beam 103 connects landing arms on the port 112 side and starboard 114 side extending out and forward some distance from the central beam at approximately thirty degree angles. An aero-body 104 covers the entire internal structure including the dampened payload pendulum 120 also shown as it is configured to move between extreme port 122 and starboard 121 positions.

Figure 6C:
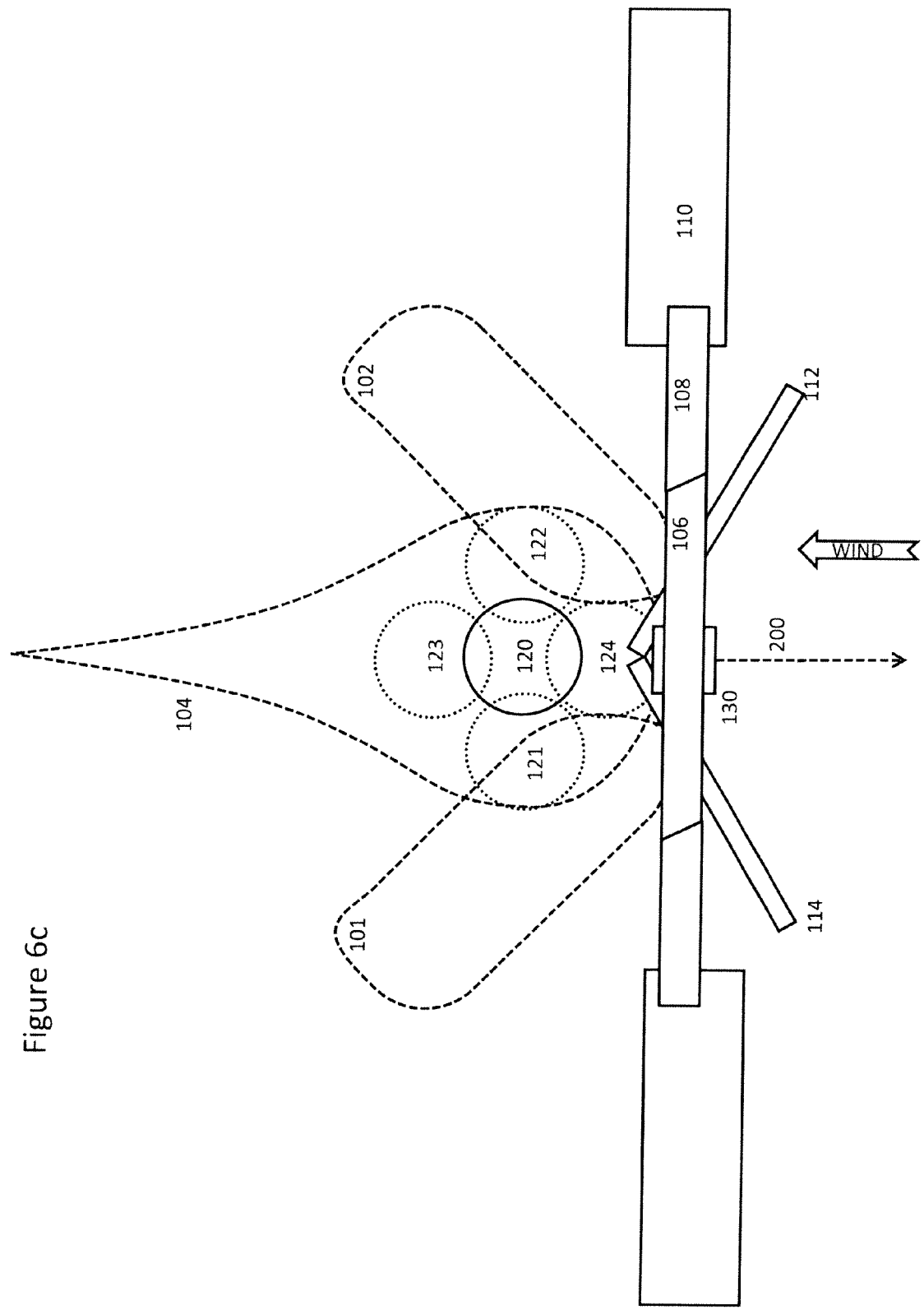
FIG. 6c is a glider overhead transparent isometric view of the glider.

FIG. 6c is an overhead isometric view looking directly down on the top of the rotor. Two of the rotor blades are left off this drawing to better reveal the glider structures below. The aero-body 104 is now clearly visible as a teardrop shape tapering toward the stern. The dampened payload pendulum 120 and four extreme movement positions are shown as 121, 122, 123, 124. The landing arms, port 112 and starboard 114 are also visible. Elevons on port 102 and starboard 101, above the landing arms are shown in outline only. The rotor head 130, flybar 106, hinged extensions 108 and blades 110, are all shown greatly simplified. The tether 200 at its connection point and usual in-flight direction are also shown.

The glider includes various rpm, contact, temperature, weather and other electrical sensors, servos and control loops (not shown) which all eventually feed their data or receive commands from the glider microcontroller which is in radio communication with the trailer microcontroller.

Figure 7B:
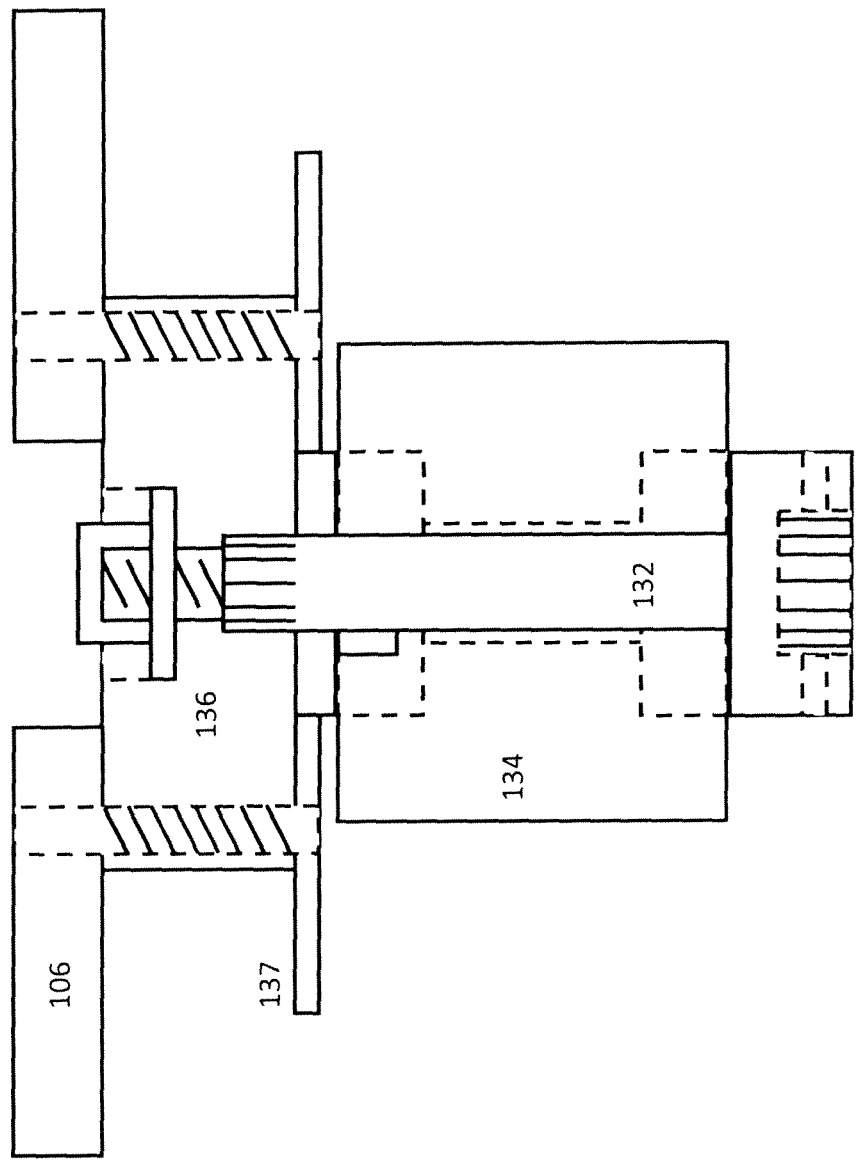
FIG. 7b is a cutaway isometric view of the entire rotor-head assembly.
Figure 7A:
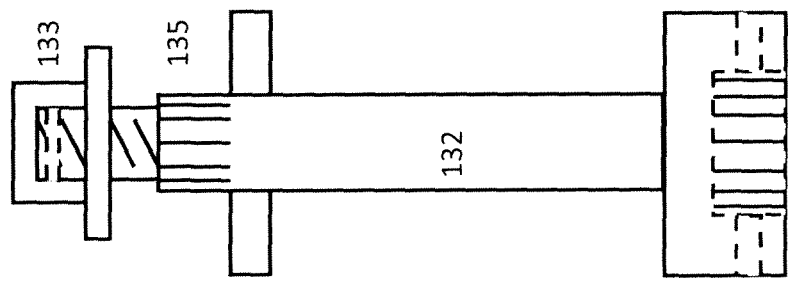
FIG. 7a is a cutaway isometric view of the rotor-head spindle.

FIG. 7a is a cross-section of the rotor-head spindle 132 with an opening at the bottom to accept the torsion tube for connection at its other end with the generator 118 shown in FIGS. 6a and 6b. The spindle 132 experiences all the load of the glider, as much as 5000 pounds so must be made of suitable materials. At the top of the spindle 132 is a wired castle nut to hold the rotor 136 in place atop the splined end 135 of the spindle 132 as illustrated in FIG. 7b along with the rotor base block 134.

FIG. 7b is a cross-section through the rotor spindle 132, rotor base block 134, and rotor head 136. Mounted to the bottom of the head is a pre-rotator toothed plate 137 built of stainless steel. Mounted to the top of the rotor head 136 is a hub bar 106, not shown to scale.

Figure 7C:
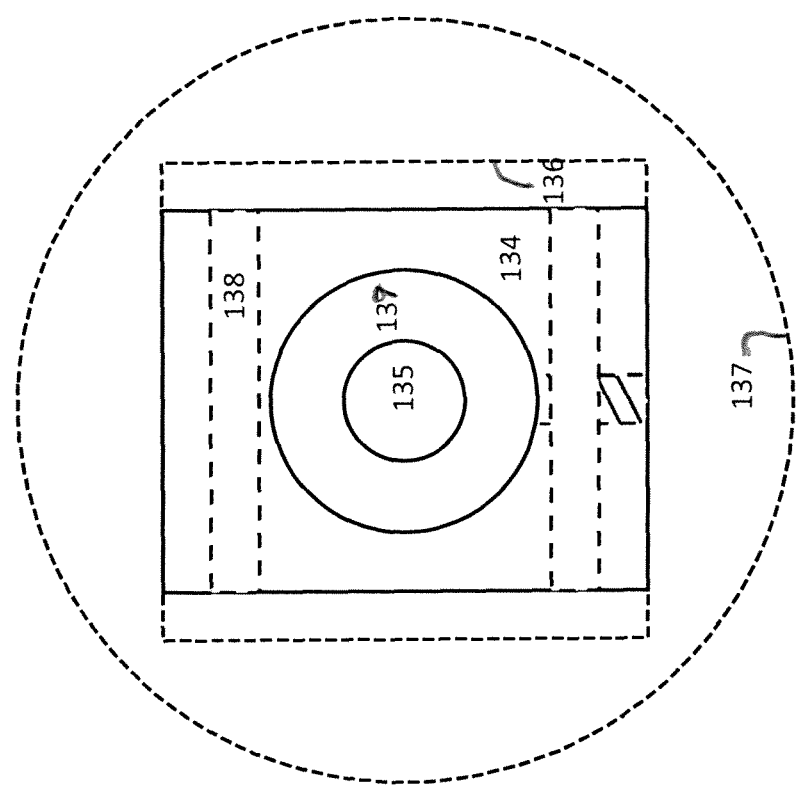
FIG. 7c is a top transparent isometric view of the rotor-head base.

FIG. 7c is a top view of the rotor base block 134 illustrating a top cup 139 for receiving a Timken bearing (not shown) and a hole 135 for the spindle 132. Mounting thru-holes 138 fore and aft are shown. The rotor head 136 is drawn in dashes to show its relative size. The pre-rotator toothed plate 137, also drawn in dashes, is shown as the circle.

Figure 7D:
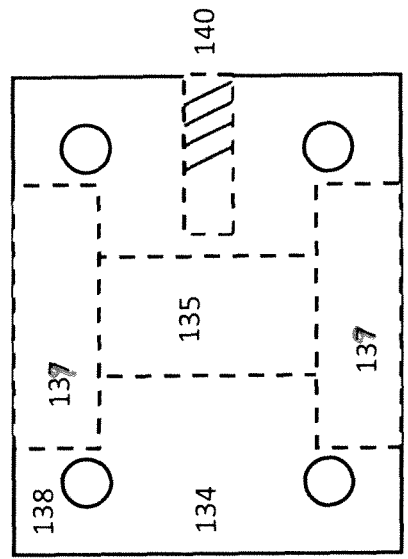
FIG. 7d is a side cross-section isometric view of the rotor-head base.

FIG. 7d is the starboard side view of the rotor-head base block 134 showing the top and bottom Timken bearing cups 137, the hole for the spindle 135, the four mounting thru-holes 138, and the tether connection point mounting hole 140.

FIG. 1a illustrates the complete physical and functional overview of the Energy Glider System. In use, major components are connected physically by a moving tether 200. These components are also connected by a control system and a means of sharing data. The output of the system is electrical power fed to some electrical load. An external component of the system is a centralized reporting and software updating facility in radio communication with other energy glider systems. The centralized reporting and software updating component is not located on-site.

The system is highly portable with all disassembled components contained within the Energy Trailer 500. The trailer is small and light enough for pulling by standard cars or trucks. When towed to a suitable location, site preparation requires only a mowing of the grass. The Energy Trailer is anchored to the ground via multiple ground anchors 602 of the style used successfully on guy-wires for telephone poles. The glider 100 and aerie 400 components are manually removed from the trailer and assembled by two people on site in a matter of hours. The Energy Trailer's electrical output is connected to the local grid and/or other electrical loads 700. The end of the tether 200 is unspooled from its reel within the Trailer 500, fed through the Aerie 400 and cradle 300 and connected to the assembled Energy Glider 100 resting atop the Aerie 400 on its cradle.

An alternative and preferred arrangement of the aerie and trailer is shown in FIG. 1c.

FIG. 1d illustrates the glider 100 in flight at the end of the tether 200, with tether flags 352 deployed every fifty feet along the length of the tether.

The glider 100 flies off of the Aerie 400, which is a multi-legged raised platform with a turntable 304—mounted, glider-specific cradle 300 at the top and ground-anchored 602 legs 402 at four or five corners. The tether 200 passes from the Energy Trailer 500 through the open center of the turntable 302 and through the cradle assembly to connect to the glider itself. The cradle is free to rotate with the wind, or with the pull of the tether when the glider is aloft.

FIGS. 2b-2e illustrate various operating positions of the glider in relation to the cradle 300 in which it is positioned atop the Aerie 400. FIG. 2b illustrates the physical relationship between the glider and the cradle as the glider is descending toward the cradle but just before the glider aero-shell makes initial contact with the oxbow. FIG. 2c illustrates the glider mated to the cradle with the cradle extension jacks withdrawn enough to rotate the glider backward ready for launch. FIG. 2d illustrates the glider rotated forward by extending the cradle extension jacks to pitch the rotor into the wind, slowing and stopping its rotation. FIG. 2e illustrates the cradle rocked to pitch the rotor horizontally for minimal wind resistance in order to pre-rotate the rotor for launch.

In operation, as illustrated in FIG. 2f, the cradle is balanced with a moving counter weight 332 in the outward position to counteract the additional weight of the glider in the cradle, not shown (and the ghost image in the inward position). The counter-weight 332 must change between these two positions very quickly. The aerie includes two pre-rotator motors 308 that spin up the glider's rotor before launch; a clamp 312 that holds the glider in place when in the cradle; and tow cradle rocking jacks 314 to pitch the glider back for launch and landing or forward into the wind to slow the rotor rotation. As the US Federal Aviation Administration (FAA) requires flags be hung every fifty feet along the tether of any 'moored object', the Aerie incorporates a tether "flag keeper" 307 within the cradle assembly to organize these flags. The flag keeper automatically connects flags 352 to the tether as it is withdrawn, and disconnects and collects those flags from the tether as it is reeled in.

The glider 100 is a multi-bladed auto-gyro employing high-inertia rotor blades capable of variable pitch. Variable pitch allows the rotor, while set at no pitch, to be over-rotated to high rpms by the pre-rotator motors in the Aerie. At the proper rpm, the blades are quickly pitched up at an appropriate angle to enable a "jump-launch" vertically, carrying the glider more than a hundred feet into the air until the blade rotation has reduced to normal flight speeds. At that point, the blades pitch down to normal gyro-flight pitch settings and the glider is held aloft solely by the apparent wind at its nose, spinning the rotor, inducing lift. Each blade is individually hinged to allow free vertical movement during each rotation, effectively allowing teetering in response to varying lift. Each blade is also mounted to the central hub with a break-away bolt allowing for reduced damage to both the blades and glider in the event of a ground-strike or other impact. The break-away bolt allows each blade to individually swing back away from the direction of rotation, reducing further impact loads when enough impact is encountered to break the bolt.

The rotor-head is non-articulated providing a firm link to the glider body. Stability of the glider in flight is induced primarily through the gyroscopic effect of the heavy rotor blades. This gyroscopic effect enables the glider to smoothly ride out most short-duration wind gusts and lulls and wind direction shifts. Stability is secondarily induced by connecting the tether at the gyro-head well above the center of gravity (CG) of the glider body. The glider body CG resides more than one quarter the rotor diameter distance below the tether connection point, the majority of that mass suspended from the head on a dampened two axis pendulum with a length one eighth the rotor diameter distance. The glider body and head are angled twenty five degrees apart, fore and aft respectively, pitching the rotor twenty five degrees rearward in normal low-wind balanced flight.

Flight attitude is controlled by three aerodynamic stabilization surfaces each less than five percent the surface area of the rotor disk. A vertical stabilizer extending rearward from the center of the body, passively controls yaw, always keeping the glider facing into the wind. The two diagonal elevons, starboard and port, extend down and rearward at forty five degree angles from the rotor head to control glider pitch and roll, both passively and actively. The default angles of attack of these elevons are aligned to maintain level flight with specific loads at specific wind speeds. As the apparent wind on the glider increases, the elevons provide just enough lift to slightly pitch the glider forward, decreasing the rotor's angle of attack to the wind, decreasing rotor lift and tether load and balancing the glider again. When the wind speed decreases, the lift on the elevons also decreases slightly, allowing the rotor to settle into a slightly higher angle of attack, repositioning the CG to come into balance again. Via this specific elevon arrangement, enabled primarily by the tether connection at the rotor's center of rotation, the glider is dynamically stable in varying wind speeds and self-correcting for gusts with no active control inputs. The natural tendency for the glider to perform increasing amplitude pendulum swings at the end of the tether because of the fixed connection between the body and rotor is eliminated by the dampened CG pendulum suspended approximately one eighth the rotor diameter down from the rotor-head. As the glider body attempts to swing to port or starboard, this larger mass maintains its position in space, counter-acting the glider's rotation. The dampening on the pendulum reduces any sideways oscillations. Similarly, the dampened pendulum counteracts porpoising of the glider in gusty conditions.

Figure 8:
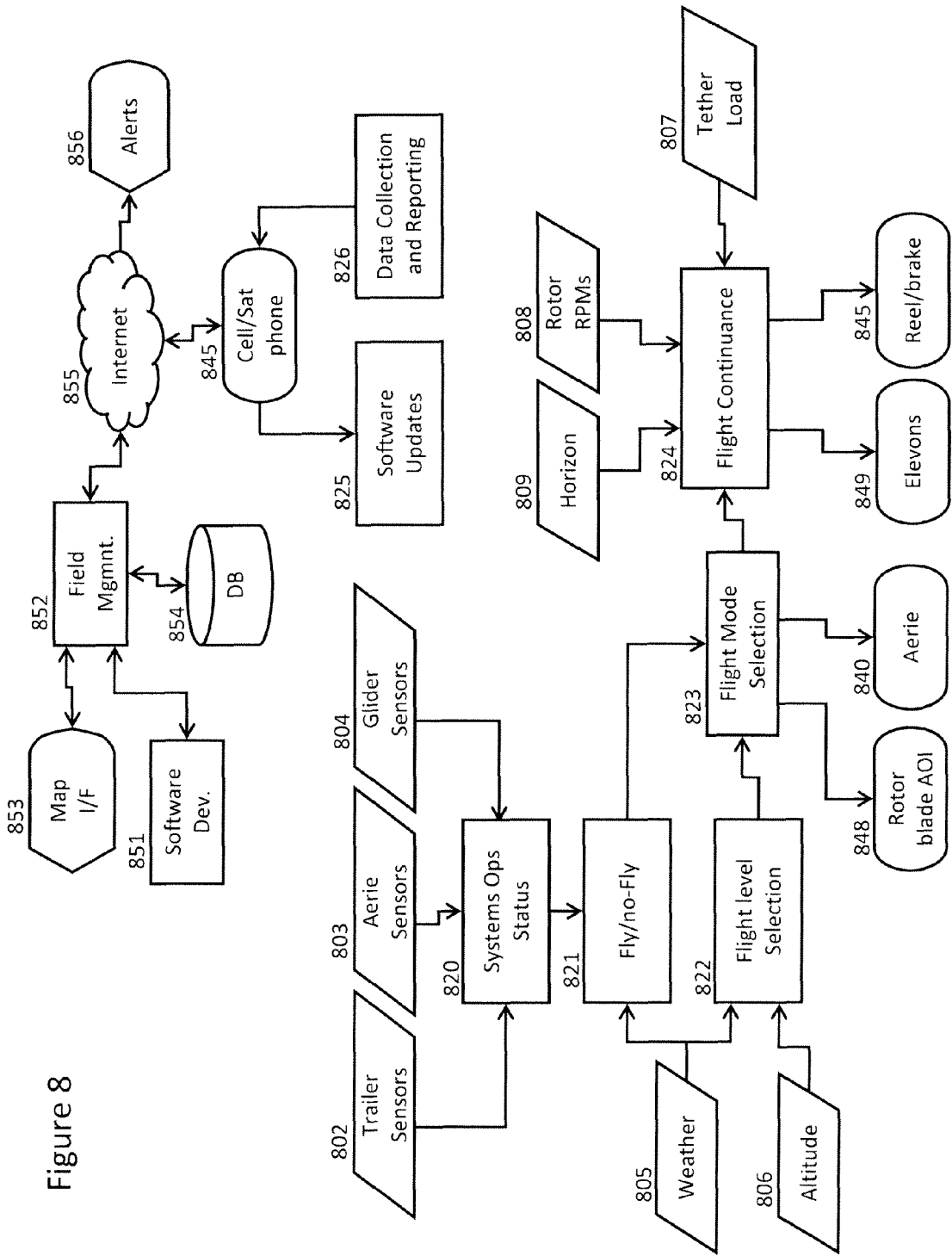
FIG. 8 is a block diagram of the major logical blocks of the control system.

FIG. 8 is a block diagram of the logical functions within the control system, and the external processes for data collection and reporting and software updates. The core process of the entire energy glider system is "flight continuance" which controls the elevons on the glider, and the reel and brake in the trailer to maintain constant tension on the tether as measured at the glider connection point. Along with rotor rpms, and a horizon indication, the flight continuance process keeps the glider flying stably in a very broad range of suitable wind speeds and gusty conditions, regardless of what flight mode may be active at the moment. Flight modes—wait, launch, ascend, float, descend, power generation, low-wind flight and land—are individual routines combining elevon movements with reel and brake adjustments. These additional functions are layered atop the normal controls performed by the flight continuance process. Flight modes are selected by a process based on input from two other processes, "fly/no-fly"—which monitors operational status of all components as well as weather data, and "flight level selection" which chooses the best altitudes at which to fly based on wind and weather conditions. FIG. 8 also illustrates the external processes for data collection and reporting and software updates. Data is collected from all components and processes continually. The pertinent data is bundled and sent as a message via the glider's on-board cell or satellite phone approximately every minute over the internet to a centralized database managed by a field management system. Minute by minute operational data from every Energy Glider system will be collected for use as both an analysis tool for product improvement; as a monitoring tool for product performance by any interested parties—presented as a map interface; as an error and notification tool for alerts for maintenance and repair; and as a virtual black box flight recorder in the case of a failure that destroys the glider. This same communication capability within the glider is used to distribute software updates from the factory to fielded systems.

As illustrated in FIG. 8, various sensors on the components within the trailer 802, on the Aerie 803 and on the Glider 804 as described hereinbefore, all feed their outputs on a real-time basis to a Systems Operational Status process 820. The output of this process is joined with real-time and predicted weather data 805 and evaluated with the Fly or No Fly process 821. Real-time Altitude data 806 is fed along with weather data 805 into the Flight Level Selection process 822 the output of which, along with the output of the Fly or No Fly process, are both fed into the Flight Mode Selection process 823 the output of which controls the Rotor Blade Angle of Incidence 848, the various controls on the Aerie 840 and is fed into the Flight Continuance process 824 to be combined with sensor data informing Horizon position 809, the Revolutions per minute of the Rotor 808, and the load on the Tether 807 to create fine adjustment controls for the glider elevons 849 and the trailer Reel motor and Brake 845.

The Data Collection and Reporting process 808 collects and packages data from all other processes and sensors within the entire system and transmits that data via the cell or satellite phone 845 over the internet 855 to the field management process 852 which manages a database 854 containing all such data and also manages alerts 856 sent out via the internet 855. A geographical Map interface 853 is the common user interface into the database 854. The software development process 851 also connects to the field management process 852 to provide Energy Glider system Software updates 825 via the internet 855 and Cell or Satellite phone 845.

Figure 9:
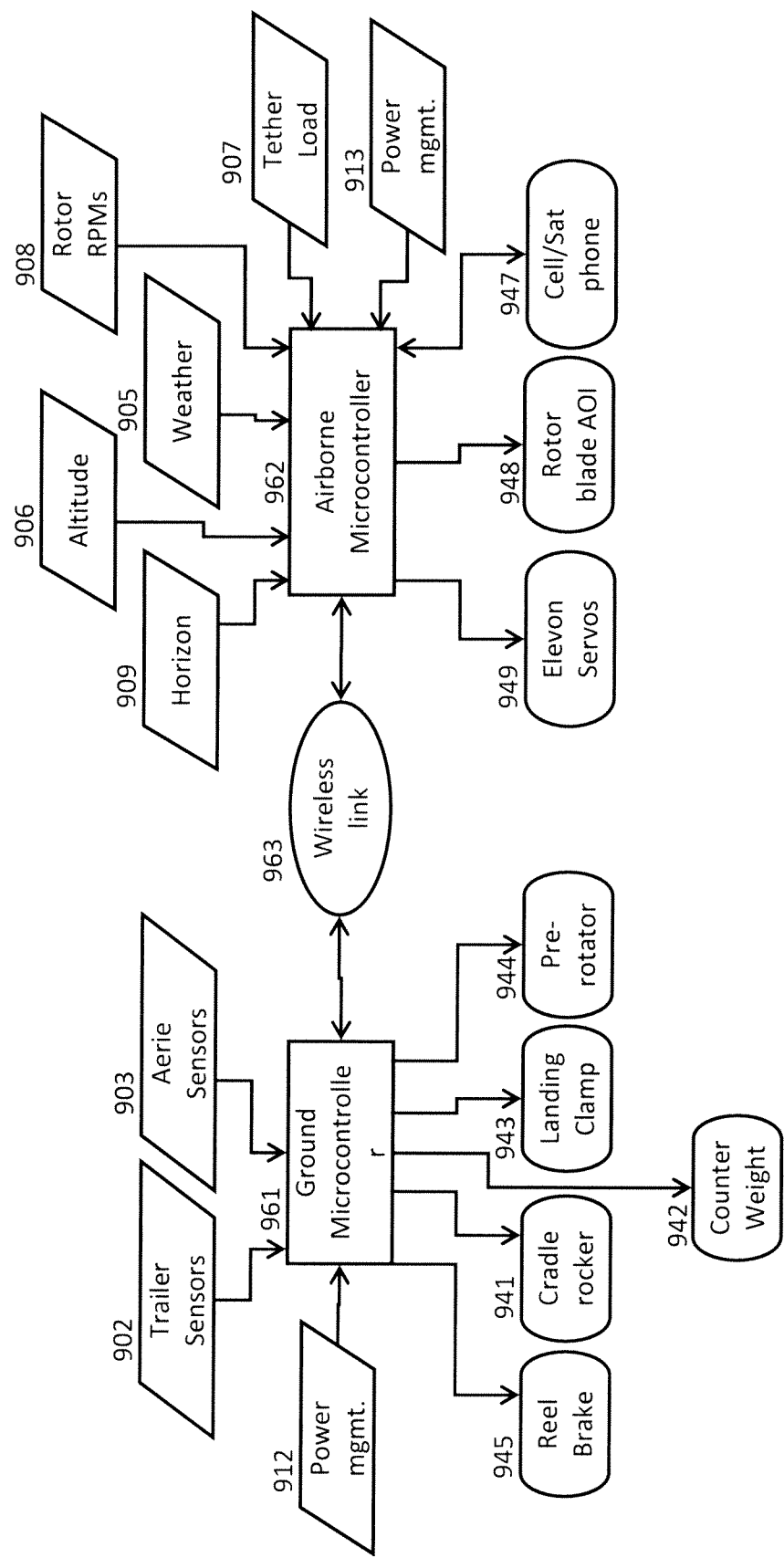
FIG. 9 is a block diagram of the major physical blocks of the control system.

Generally, FIG. 9 shows the major physical devices employed in the control systems on the ground and in the air. Both the glider and trailer have microcontrollers collecting data from various sensors and sending control signals to various devices. A wireless data link between the two microcontrollers allows the sharing of data between the two systems.

FIG. 9 illustrates the major physical intelligence-forming blocks within the entire Energy Glider system.

Various sensors on the components within the trailer 902 and on the Aerie 903 provide real-time data along with Power Management information 912 to the Ground Microcontroller 961 within the Trailer. The Microcontroller 961 processes this data and controls the Reel Motor and Brake 945, the Cradle Rocker 941, the Cradle Counter Weight 942, the Cradle Landing Clamp 943 and the Cradle Pre-Rotator motors 944. Data from this Microcontroller is shared via the Wireless Link 963, with the Microcontroller in the Glider 962. This Microcontroller 962 also is fed real-time data from sensors including Horizon data 909, Altitude 906, Weather 905, Rotor RPMs 908, Tether Load 907 and on-board Glider Power Management data 913. The Microcontroller controls the Servos moving the Elevons 949, the Rotor Blade Angle of Incidence 948, and the Cell or Satellite phone.

For flight attitudes other than stable altitude maintenance, changes to the angles of attack of the elevons are affected by a servo control system. The servos are adjusted automatically in response to data from a variety of glider-mounted sensors including a complete weather station, gyroscope, rotor rpm monitor, altimeter and tether load-cell. These sensors inform a control loop that adjusts the glider's pitch and roll whenever necessary. With inherent flight stability, active adjustment typically occurs only during operational modes other than 'float', as described with respect to control modes discussed below. In descent mode for example, the glider is controlled to pitch forward to descend while the reel motor in the Energy Trailer is adjusted to retract at varying speeds managed by this control loop monitoring these sensor inputs. With additional fine control of the elevons, the control loop maintains a constant load on the tether, within a narrow range measured at the glider, to minimize system wear and tear.

Similarly, in ascent during power generation mode, the elevons initiate a pitch upward of the rotor, the load-cell monitors the lift the rotor generates as rpms increase. When that lift approaches a pre-determined range, indicated by the tether load cell, the tether reel brake is smoothly released, allowing the glider to rise and produce electricity in the generator, while again maintaining the tether load within proscribed limits to reduce system wear and tear. An interesting phenomenon of rotor-gliders (auto-gyros) makes them particularly well-suited for ground-gen AWECS; as the load on a rotor is increased in a constant speed wind, the rotor rpms increase, providing more lift. The Energy Glider control software takes advantage of this by holding the tether brake while increasing the rotor's angle of attack into the wind. This action increases the rotor RPMs increasing lift, pulling the tether taut so when the tether brake is released, adequate torque for energy generation is instantly available at the ground.

Data from the onboard weather station enables two critical determinations. First is "fly or no-fly". While the glider is designed for all weather operation, winds of hurricane force, winds of less than about six miles per hour, and icing could make flight continuance impossible. To determine those conditions, a number of weather sensors providing real-time data on temperature, humidity, barometric pressure, ambient light and wind speed are mounted to the glider. Data from these sensors is continually considered along with the glider's heading (determining wind direction) and altitude. When winds become too high or too low or too turbulent at the current flight level, it ascends or descends to flight levels with better conditions. When conditions become unacceptable at all flight levels, the glider descends to rest atop the aerie. When any of a combination of wind speed, wind direction, temperature, humidity, ambient light or barometric pressure change over some short time frame, the glider will descend to the aerie in anticipation of a storm. When temperature and humidity indicate possible icing conditions, the glider will seek higher or lower altitudes possible for either flight continuance or energy production, depending on wind conditions, or descend to the ground.

The second determination from weather data is the selection of flight levels. In good weather and normal operations, wind speed is sampled as the glider ascends through its flight region. With this information, the glider determines the best range of altitudes to fly within—seeking winds at or above its ideal power production speed (25 mph) across as broad an altitude range as possible—700 feet or more. Winds too high, likely at the highest altitudes, may be avoided if more suitable winds may be found lower, though across a narrowing range of altitudes. With adequate winds across at least 200 feet of altitude, the glider will choose to produce energy. Broader ranges of altitudes are preferred to reduce the number of power stroke cycles experienced, reducing system wear and tear.

Each Energy Glider incorporates a cell or satellite phone used to 'call-home' with data and status updates on a minute-by-minute basis. This transmitted data is collected in a central database which then displays its contents via a map interface. The map interface shows the locations of every Energy Glider around the world. Clicking on any glider location displays its near-real-time operational data and any errors. Should a critical error occur in any Energy Glider, it is immediately called-home via the cell or sat phone triggering an alert sent out via the appropriate means to the appropriate parties.

Communication between the Energy Trailer and the Energy Glider is accomplished via wireless. A microcontroller system of appropriate size and power is contained within both components performing all monitoring, reporting and decision making processes.

The glider's on-board electronics and FAA-required anti-collision lights are powered by an on-board electrical generator 118 in FIG. 6, mounted to the end of the torsion tube, which scavenges a small amount of rotational energy off the rotor. This generation imparts a slight counter rotation in the glider body, pre-compensated for by the vertical stabilizer. Energy is stored in on-board batteries not shown, in the pendulum payload 120. The battery charging circuit requests more power from the generator when wind conditions are high and less when wind conditions are low, reducing the imparted rotation on the glider.

The Energy Glider as described works in the following operational modes:

Wait: Glider atop aerie, cradle leaning forward in spin-down position, sensing wind and weather, waiting for conditions to reach optimal.

Launch—jump: Wind conditions at the glider have reached optimal. The cradle is adjusted for spin-up position—parallel with the horizon. The pre-rotator motors are started and the rotor spun up to adequate speed—approximately 500 rpms. The cradle is adjusted to launch position. The rotor blade angle of incidence is gradually increased to its maximum over a few seconds. As the load on the tether increases, the brake on the reel is gradually released in less than a second, allowing the glider to launch into the air.

Ascent: The glider is held in a climb attitude via elevon control while the brake is controlled to keep constant tension on the tether.

Float: The glider is held in a neutral attitude via elevon control while the brake is maintained on the reel.

Descent: The glider is held in a descent attitude via elevon control while the reel is controlled to keep constant tension on the tether.

Power-production: The glider performs cycles of ascent, float, descent, float with the ascent mode adjusted for maximum lift and vertical speed.

Low-wind flight: With the reel brake applied, the glider is controlled to weave left and right (relative to the tether), to increase the glider's apparent wind speed, maintaining rotor RPMs and lift.

Land: Preceded by descent-mode, as the glider approaches the aerie, its descent angle is reduced via elevon control, increasing tether tension while reel speed is quickly decreased to bring the glider to smooth landing atop its cradle. The cradle is then adjusted for spin-down—leaning into the wind.

The several embodiments described herein are solely for the purpose of illustration. Those skilled in the art will note that various substitutions may be made to those embodiments described herein without departing from the spirit and scope of the present invention. Those skilled in the art will also recognize from this description that other embodiments may be practiced with modifications and alterations limited only by the claims.

What is claimed is:

1. A power generation system, comprising:
   a glider having rotor blades with an adjustable angle, and having first weather sensors obtaining first weather information at an area of said glider;
   a generator attached to said glider with a tether, said generator adapted to generate electricity in response to tension and motion of said tether caused by movement of said glider, said generator receiving second weather information from a central weather database;
   a tether reel controllable to reel in and out said tether;
   radio communication equipment providing flight control signals to said glider; and
   a processor programmable to generate said flight control signals, wherein said processor uses information from both said first weather sensors on said glider, and said second weather information received by the generator to generate said flight control signals, where both said weather sensor on said glider and said second weather information are used to determine both an altitude and an aspect of flying of said glider, wherein said processor determines flight modes including all of ascend mode by adjusting said rotor blades to a first angle, float mode by adjusting said rotor blades to a second angle, descend mode by adjusting said rotor blades to a third angle, and power generation mode which uses multiple angles at different times.

2. The power generation system of the claim 1, further comprising weather sensors on said generator, said weather sensors producing third weather information indicative of weather on the ground, and wherein said processor uses information from all of said first weather information, said second weather information and said third weather information for determining said flight modes.

3. The power generation system as in claim 2, wherein said processor also generates a mode for low-wind flight in which the reel is maintained braked while the glider is controlled to weave left and right relative to the tether, to increase the glider's apparent wind speed.

4. The power generation system as in claim 2, wherein said processor uses said first and second weather information to determine that winds at a first altitude are not good for flying or for power generation, and uses said ascend mode or descend mode to ascend or descend to flight levels with better conditions.

5. The power generation system of claim 2, wherein said processor uses both said first and second weather information to generate a fly or no-fly determination, using all of real time actual data and also using predicted weather data.

6. The power generation system of claim 1, wherein the ascend-mode holds said glider in a climb attitude, said float mode holds said glider in a neutral attitude, said descend mode holds said glider in a descent attitude and said power generation mode causes said glider to perform cycles of ascent, float, descent, float with the ascent during the power generation mode adjusted for maximum lift and vertical speed.

7. The power generation system of claim 1, wherein said processor generates reel control signals to said tether.

8. A power generation system, comprising:
   a rotor glider having rotor blades with an adjustable angle, and having first weather sensors obtaining first weather information at an area of said glider;
   a generator tethered to said rotor glider by a tether, said generator adapted to generate electricity in response to tension and motion of said tether provided by said rotor glider interacting with wind;
   a tether reel controllable to reel in said tether and to reel out said tether; radio communication equipment providing flight control signals to said glider and providing reel control signals to said tether reel; and
   a processor programmable to generate said flight control signals wherein said processor uses said first weather information from said first weather sensors on said rotor glider, and said processor receives second weather information from a central weather database, and uses both said first and second weather information to generate said flight control signals, where both said first and second weather information are used to determine both an altitude and an aspect of flying of said glider including all of all of ascend mode without optimizing for power generation by adjusting said rotor blades to a first angle, float mode without optimizing for power generation by adjusting said rotor blades to a second angle, descend mode without optimizing for power generation by adjusting said rotor blades to a third angle, and power generation mode, where in said power generation mode the glider performs cycles of ascent, float, descent, float with the ascent adjusted for maximum lift and vertical speed based on both said first weather information and said second weather information and in said power generation mode, the glider uses a series of different angles for said rotor blades.

9. The power generation system of claim 8, wherein said processor also generates a mode for low-wind flight in which the tether reel is maintained braked while the glider is controlled to weave left and right relative to the tether, to increase the glider's apparent wind speed.

10. The power generation system as in claim 8, wherein said processor uses said first and second weather information to determine that winds at a first altitude are not good for flying or for power generation, and uses said ascend mode or descend mode to ascend or descend to flight levels with better conditions.

11. The power generation system of claim 8, wherein said processor uses both said first and second weather information to generate a fly or no-fly determination, using all of real time actual data and also using predicted weather data.

12. The power generation system of claim 8, further comprising weather sensors on said generator, said weather sensors producing third weather information indicative of weather on the ground, and wherein said processor uses information from all of said first weather information, said second weather information and said third weather information for determining said flight modes.

13. A power generation system, comprising:
   a glider that includes a wind-interacting element and a generator attachment and also first weather sensors on the glider, said glider having rotor blades with an adjustable angle;
   a generator, attached to the generator attachment;
   said generator attachment being moved by the glider to generate power in said generator, by the glider interacting with wind; and
   a processor programmable to generate flight and power control signals for the glider, wherein said processor uses first weather information from said first weather sensors on said glider, and also uses second weather information received from a central weather database to generate said flight and power control signals, where both said first weather information and said second weather information are used to determine both an altitude and an aspect of flying of said glider including all of all of ascend mode without optimizing for power generation by adjusting said rotor blades to a first angle, float mode without optimizing for power generation by adjusting said rotor blades to a second angle, descend mode without optimizing for power generation by adjusting said rotor blades to a third angle, and power generation mode, where in said power generation mode the glider performs cycles of ascent, float, descent by changing adjustment of the rotor blades, with the ascent adjusted for maximum lift and vertical speed based on both said first weather information and said second weather information.

14. The power generation system as in claim 13, wherein said processor also generates a mode for low-wind flight in which a distance of the glider from the generator is maintained constant while the glider is controlled to weave left and right, to increase the glider's apparent wind speed.

15. The power generation system as in claim 13, wherein said processor uses said first and second weather information to determine that winds at a first altitude are not good for flying or for power generation, and uses said ascend mode or descend mode to ascend or descend to flight levels with better conditions.

16. The power generation system of claim 13, wherein said processor uses both said first and second weather information to generate a fly or no-fly determination, using all of real time actual data and also using predicted weather data.

17. The power generation system as in claim 13 further comprising weather sensors on said generator, said weather sensors producing third weather information indicative of weather on the ground, and wherein said processor uses information from all of said first weather information, said second weather information and said third weather information for determining said flight modes.

* * * * *